United States Patent
Line et al.

(10) Patent No.: US 11,407,334 B2
(45) Date of Patent: Aug. 9, 2022

(54) SEAT CONNECTION ASSEMBLY

(71) Applicant: Ford Global Technologies, LLC, Dearborn, MI (US)

(72) Inventors: Johnathan Andrew Line, Northville, MI (US); Jimmy Moua, Canton, MI (US); Joshua Gauthier, South Lyon, MI (US); Macit Aktas, Windsor (CA); Gregory Hagedorn, Bloomfield Hills, MI (US); Joseph Michael Kish, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 507 days.

(21) Appl. No.: 16/585,439

(22) Filed: Sep. 27, 2019

(65) Prior Publication Data

US 2021/0094444 A1 Apr. 1, 2021

(51) Int. Cl.
*B60N 2/07* (2006.01)
*B60N 2/005* (2006.01)
*B60R 16/03* (2006.01)
*B60N 2/02* (2006.01)

(52) U.S. Cl.
CPC ............... *B60N 2/07* (2013.01); *B60N 2/005* (2013.01); *B60N 2/0232* (2013.01); *B60R 16/03* (2013.01); *B60N 2002/0264* (2013.01)

(58) Field of Classification Search
CPC .... B60N 2/005; B60N 2/015; B60N 2/01508; B60N 2/0224; B60N 2/0232; B60N 2/07; B60R 16/03
USPC ................ 296/65.03, 65.13, 68.1
See application file for complete search history.

(56) References Cited

U.S. PATENT DOCUMENTS

| 6,050,835 A | 4/2000 | Henrion et al. | |
|---|---|---|---|
| 6,257,641 B1 * | 7/2001 | Fritz | B60N 2/0224 297/217.3 |
| 6,752,445 B1 | 6/2004 | Koehler et al. | |
| 7,284,989 B1 * | 10/2007 | Hanlon | H01R 13/6315 439/700 |
| 9,278,663 B1 * | 3/2016 | Hallman | B60N 2/005 |
| 2007/0117426 A1 * | 5/2007 | Pavlovic | B60N 2/01508 439/136 |

(Continued)

FOREIGN PATENT DOCUMENTS

| FR | 2776591 A1 * | 10/1999 | ......... B60N 2/01583 |
|---|---|---|---|
| KR | 20050106962 A | 11/2005 | |
| WO | 2009077818 A1 | 6/2009 | |

*Primary Examiner* — Jason S Daniels
(74) *Attorney, Agent, or Firm* — Vichit Chea; Price Heneveld LLP

(57) ABSTRACT

A vehicle seating assembly includes a seat base. A carriage is coupled to a lower surface of the seat base and includes a locating protrusion on a bottom surface thereof. The track assembly includes a rail. A rail cartridge is slidably engaged with the rail. The rail cartridge defines a locating hole for receiving the locating protrusion. A first electrical connector is coupled to the rail cartridge. A second electrical connector is coupled to the carriage and operable between engaged and disengaged positions. An actuation member is configured to move the second electrical connector between the engaged and disengaged positions. When the second electrical connector is in the engaged position, an electrical connection is formed between the first and second electrical connectors.

20 Claims, 21 Drawing Sheets

(56) References Cited

U.S. PATENT DOCUMENTS

| | | | | |
|---|---|---|---|---|
| 2007/0132265 A1* | 6/2007 | Tsukamoto | .......... | B60N 2/0155 296/65.03 |
| 2009/0267376 A1* | 10/2009 | McDermott | ....... | B60N 2/01591 296/65.03 |

* cited by examiner

SEAT CONNECTION ASSEMBLY

FIELD OF THE DISCLOSURE

The present disclosure generally relates to a seat connection assembly. More specifically, the present disclosure relates to a seat connection assembly for a vehicle.

BACKGROUND OF THE DISCLOSURE

Vehicle seats in a vehicle are often adjustable and/or removable from within the vehicle. These vehicle seats may be electrically coupled with the vehicle.

SUMMARY OF THE DISCLOSURE

According to at least one aspect of the present disclosure, a vehicle seating assembly includes a seat base. A carriage is coupled to a lower surface of the seat base and includes a locating protrusion on a bottom surface thereof. A track assembly includes a rail cartridge slidably engaged with the rail. The rail cartridge defines a locating hole for receiving the locating protrusion. The first electrical connector is coupled to the rail cartridge. A second electrical connector is coupled to the carriage and is operable between engaged and disengaged positions. An actuation member is configured to move the second electrical connector between the engaged and disengaged positions. When the second electrical connector is in the engaged position, an electrical connection is formed between the first and second electrical connectors.

According to another aspect of the present disclosure, a seating assembly includes a track assembly, which includes a rail. A carriage includes a bracket that defines a locating protrusion that extends from a bottom surface thereof. A rail cartridge is slidably engaged with the rail and defines a locating hole in an upper surface thereof to receive the locating protrusion. A first electrical connector is coupled to the rail cartridge. A second electrical connector is coupled to the bracket and is configured to engage and disengage with the first electrical connector. An actuation member is operable between first and second positions and is configured to engage the second electrical connector. When the actuation member is in the second position, the first and second electrical connectors are engaged and form an electrical connection.

According to another aspect of the present disclosure, a seat connection assembly includes a track assembly that includes a rail in a rail cartridge slidably engaged with the rail. A carriage bracket is coupled to an upper surface of the rail cartridge. A motor is disposed in the rail cartridge and translates the rail cartridge along the rail. A first electrical connector is coupled to the rail cartridge. A second electrical connector is coupled to the carriage bracket and is operable between engaged and disengaged positions. The second electrical connector engages the first electrical connector in the engaged position to form an electrical connection. An actuation member is configured to move the second electrical connector between the engaged and disengaged positions.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
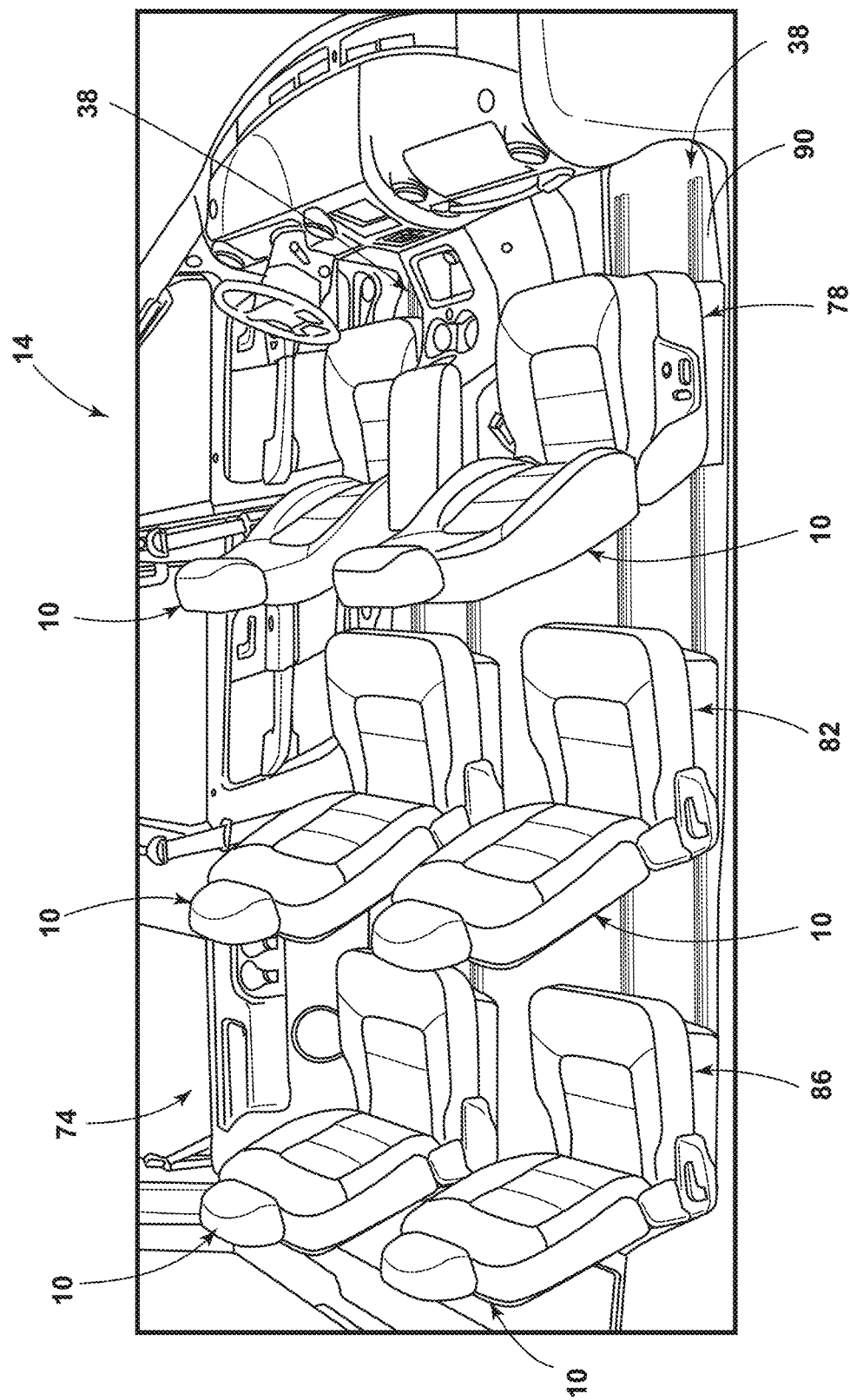
FIG. 1 is a side perspective view of a passenger cabin of a vehicle, according to the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-21, reference numeral 10 generally refers to a seating assembly for vehicle 14 that includes a seat base 18. A carriage 22 is coupled to a lower surface 26 of the seat base 18 and includes a locating protrusion 30 on a bottom surface 34 thereof. A track assembly 38 includes a rail 42. A rail cartridge 46 is slidably engaged with the rail 42. The rail cartridge 46 defines a locating hole 50 for receiving the locating protrusion 30. A first electrical connector 54 is coupled to the rail cartridge 46. A second electrical connector 58 is coupled to the carriage 22 and is operable between engaged and disengaged positions 62, 66. An actuation member 70 is configured to move the second electrical connector 58 between the engaged and disengaged positions 62, 66. When the second electrical connector 58 is in the engaged position 62, an electrical connection is formed between the first and second electrical connectors 54, 58.

Referring to FIG. 1, the vehicle 14 includes a passenger cabin 74 having multiple seating assemblies 10. The seating assemblies 10 may be arranged in at least one of a first seating row 78, a second seating row 82 and a third seating row 86. The first seating row 78 is disposed in a vehicle-forward portion of the vehicle 14, the third seating row 86 is disposed in a vehicle-rearward portion of the vehicle 14, and the second seating row 82 is disposed therebetween. It is contemplated that the seating assemblies 10 may be disposed between the defined seating rows (e.g., the first, second, and third seating rows 78, 82, 86) without departing from the teachings herein. The vehicle 14 may be a sedan, a sport utility vehicle, a van, a truck, a crossover, or other style vehicles 14. The vehicle 14 may be a manually operated vehicle 14 (e.g., with a human driver), a fully autonomous vehicle 14 (e.g., no human driver), or a partially autonomous vehicle 14 (e.g., may be operated with or without a human driver). Additionally, the vehicle 14 may be utilized for personal and/or commercial purposes, such as for ride-providing services (e.g., chauffeuring) and/or ride-sharing services.

Figure 2:
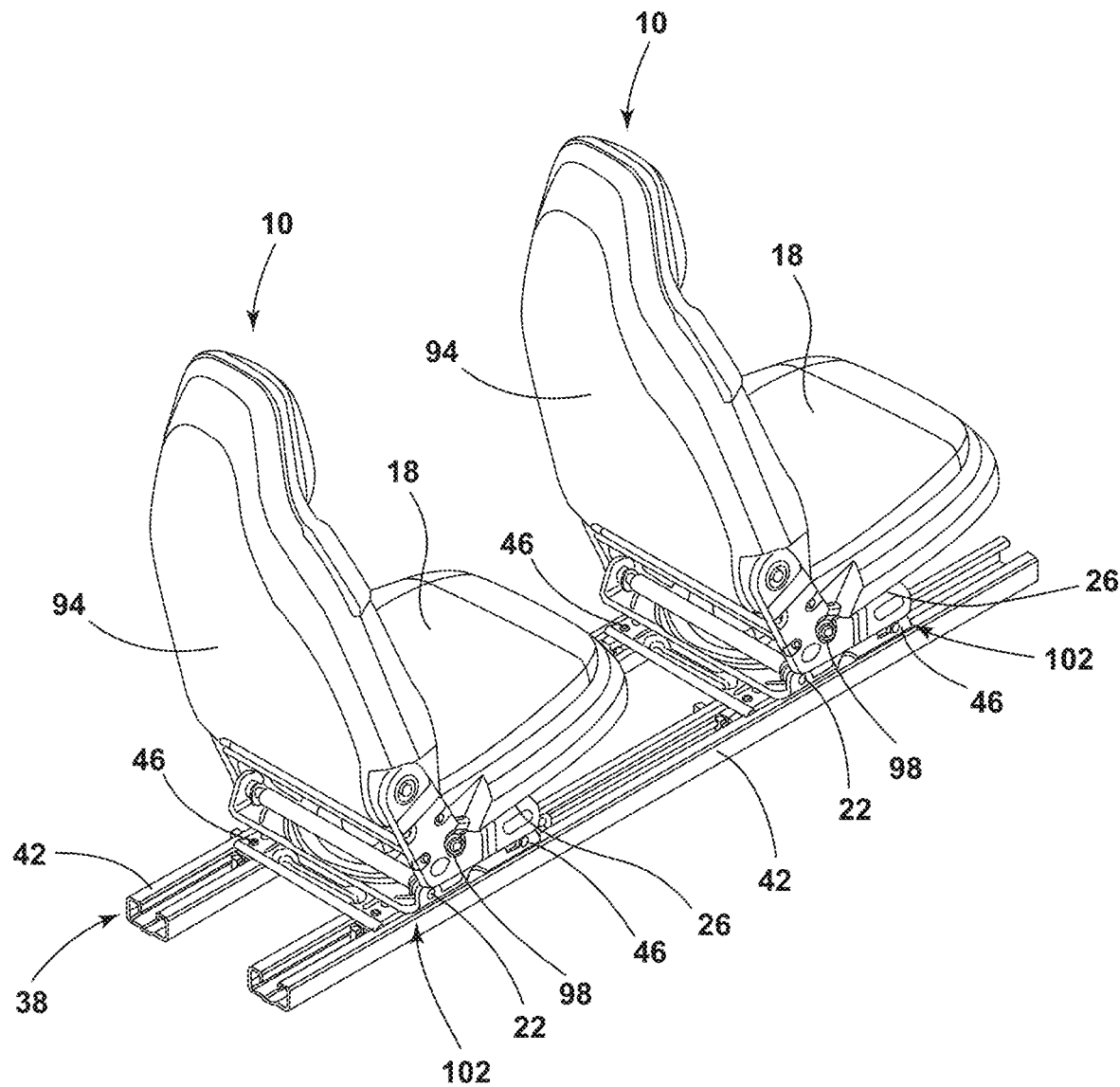
FIG. 2 is a side perspective view of seating assemblies with rail cartridges positioned on a track assembly for a vehicle, according to the present disclosure.

Referring to FIGS. 1 and 2, the vehicle 14 may include the track assembly 38 disposed on a vehicle floor 90. The seating assemblies 10 may be positioned along the track assembly 38. As illustrated in FIG. 1, the vehicle 14 includes the track assembly 38 extending between the first seating row 78 and the third seating row 86. Accordingly, the seating assemblies 10 are translatable between fore and aft positions along the track assembly 38. In various examples, the vehicle 14 may include two track assemblies 38. In this way, the seating assemblies 10 on a driver side of the vehicle 14 may be coupled to one track assembly 38 and the seating assemblies 10 on a passenger side of the vehicle 14 may be coupled to an additional track assembly 38. It is contemplated that the track assemblies 38 may be substantially similar to one another. The seating assemblies 10 may be independently translatable, such that a single seating assembly 10 can be moved along the track assembly 38. Additionally or alternatively, the seating assemblies 10 may be stored within the vehicle 14, and/or removable from the vehicle 14, to allow for movement of other seating assemblies 10 between the fore and aft positions. According to various aspects, there may not be seating assemblies 10 disposed in at least one of the first, second, and/or third seating rows 78, 82, 86. The track assemblies 38 may provide various seating configurations within the vehicle 14 for a variety of user purposes.

Each of the seating assemblies 10 may include a seatback 94 operably coupled to the seat base 18. In various examples, the seat base 18 and the seatback 94 may be pivotally coupled to one another. Additionally or alternatively, each of the seating assemblies 10 may include a positioning motor 98 for adjusting the seatback 94 relative to the seat base 18. The seat base 18 may be coupled to the carriage 22. The seating assemblies 10 may each couple to the respective track assembly 38 via the carriage 22. The seat base 18 may couple to the carriage 22 and the carriage 22 may couple to the rail cartridge 46 associated with the track assembly 38.

In various examples, each track assembly 38 may include one or more rails 42. The rails 42 of each track assembly 38 may be positioned within the vehicle 14 and spaced-apart from one another, as illustrated in FIGS. 1 and 2. The rails 42 can be arranged along longitudinal, lateral, and/or angular (e.g., diagonal) directions within the passenger cabin 74. Each rail 42 may be integrally formed with a vehicle floor 90. Alternatively, each rail 42 may be coupled with the vehicle floor 90. The rails 42 may be positioned beneath the floor cover of the vehicle 14, or alternatively, the rails 42 may extend above the floor cover of the vehicle 14 and protrude into the passenger cabin 74 of the vehicle 14. Stated differently, the rails 42 of the track assemblies 38 may be visible or hidden to an occupant within the vehicle 14 depending on the configuration of the vehicle 14.

Figure 3:
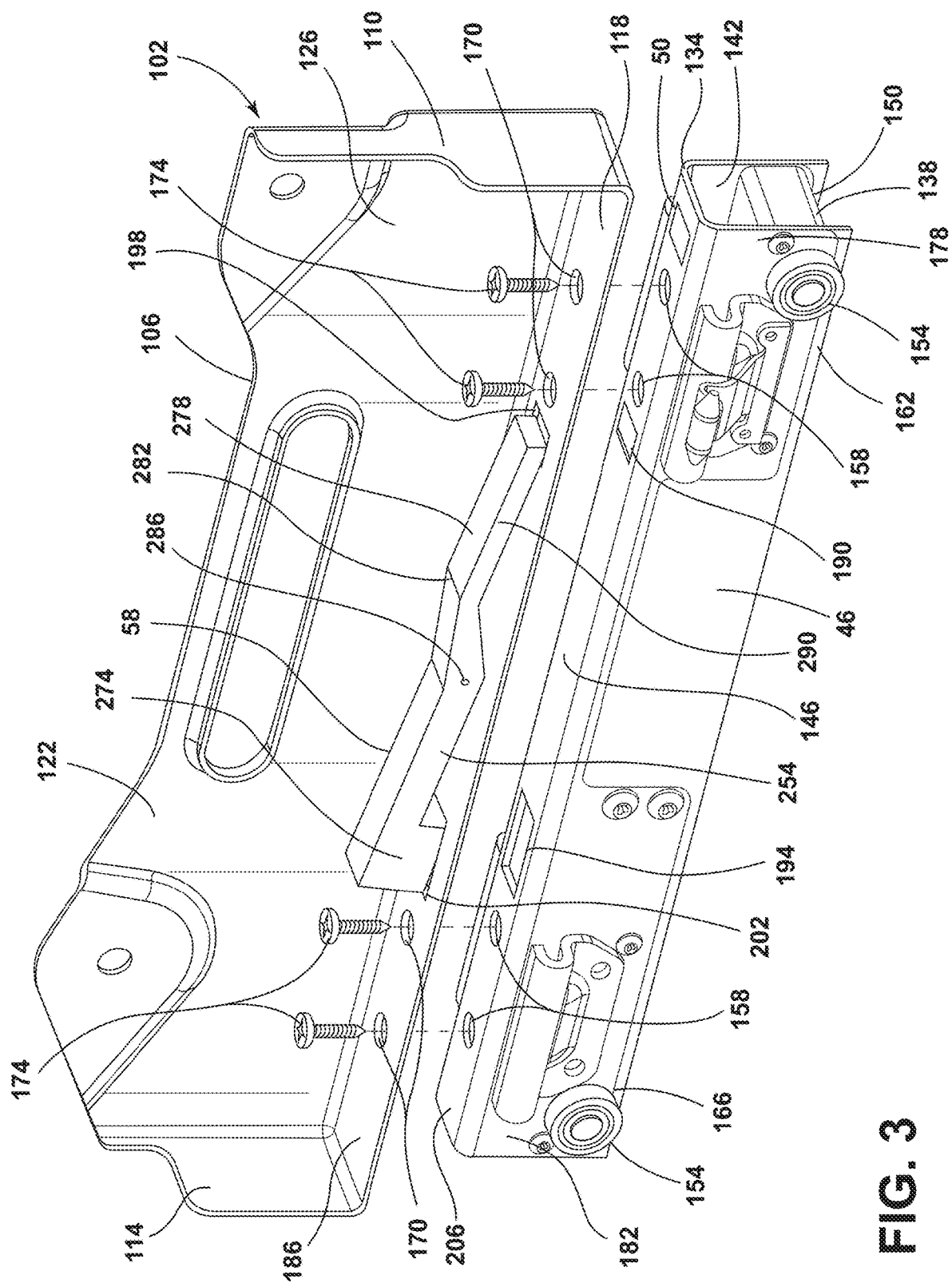
FIG. 3 is an exploded view of a carriage bracket of a seating assembly and an associated rail cartridge for a track assembly, according to the present disclosure.

Referring to FIGS. 2 and 3, the seating assembly 10 may slidably engage the track assembly 38 via a carriage assembly 102. In various examples, the carriage 22 may be coupled to the lower surface 26 of the seat base 18. The carriage 22 may include a carriage bracket 106 may include first and second bracket end walls 110, 114 that extends vertically from a bottom wall 118. Additionally or alternatively, the carriage bracket 106, which may include a bracket sidewall 122 that extends vertically from the bottom wall 118 and between the first and second bracket end walls 110, 114. In various examples, the first and second bracket end walls 110, 114, the bottom wall 118, and the bracket sidewall 122 may define a cavity 126 therein for housing the second electrical connector 58.

According to various aspects, the carriage bracket 106 may be selectively coupled to the rail cartridge 46. The rail cartridge 46 may be an elongated member that includes upper and lower portions 134, 138 that define a channel 142 therein. The upper portion 134 of the rail cartridge 46 may include an upper wall 146 and the lower portion 138 may include a lower wall 150. The upper and lower walls 146, 150 may define the upper and lower boundaries of the channel 142.

Referring still to FIGS. 2 and 3, the rail cartridge 46 may be configured to move along the respective track assembly 38. In various examples, two rail cartridges 46 may be coupled to a single seating assembly 10 and configured to move the seating assembly 10 along the rail 42 of the track assembly 38 associated with the seating assembly 10. In various examples, the two rail cartridges 46 may be substantially similar. Alternatively, the two rail cartridges 46 may be different, such that one rail cartridge 46 is a lead rail cartridge 46 and the other is a follower rail cartridge 46. The rail cartridge 46 may include wheels 154 configured to engage the corresponding rail 42. According to various aspects, the rail cartridge 46 may be a width less than a width of a space defined by outer supports of the rail 42. Stated differently, the rail cartridge 46 may be disposed within the rail 42 and configured to translate fore and aft along the rail 42. In this way, the rail cartridge 46 may be configured to translate the seating assembly 10 fore and aft along the track assembly 38. The rail cartridge 46 may slidably engage the rail 42 to move the seating assembly 10 along the track assembly 38.

Referring to FIG. 3, an upper wall 146 of the rail cartridge 46 may define at least one receiving hole 158. In various examples, the upper wall 146 may define receiving holes 158 on opposing end portions 162, 166 of the rail cartridge 46. Additionally or alternatively, the bottom wall 118 of the carriage bracket 106 may define more than one corresponding receiving hole 170. The corresponding receiving holes 170 may be configured to align with the receiving holes 158 of the rail cartridge 46 to receive a fastener 174. In this way, the carriage bracket 106 may be mechanically fastened to the rail cartridge 46. The fastener 174 may be, for example, a screw, a bolt, a rivet, or other similar mechanical fasteners 174. When the carriage bracket 106 is coupled to the rail cartridge 46, the first bracket end wall 110 may be substantially vertically aligned with a first end 178 of the rail cartridge 46. The second bracket end wall 114 may be offset from the second end 182 of the rail cartridge 46. In this way, the bottom wall 118 may extend longer than the upper wall 146 of the rail cartridge 46 and define an overhang portion 186 that extends past the second end 182 of the rail cartridge 46.

According to various aspects, the upper wall 146 of the rail cartridge 46 may define first and second cartridge apertures 190, 194 that are spaced-apart from one another. The bottom wall 118 of the carriage bracket 106 may define first and second bracket apertures 198, 202. In various examples, when the carriage bracket 106 is coupled with the rail cartridge 46, the first and second bracket apertures 198, 202 are aligned with the first and second cartridge apertures 190, 194. The second electrical connector 58 may be disposed in the cavity 126 on the bottom wall 118 and extends over both of the first and second bracket apertures 198, 202. Stated differently, the first and second cartridge apertures 190, 194 and the first and second bracket apertures 198, 202 align with one another with the second electrical connector 58 extending thereover.

Figure 4:
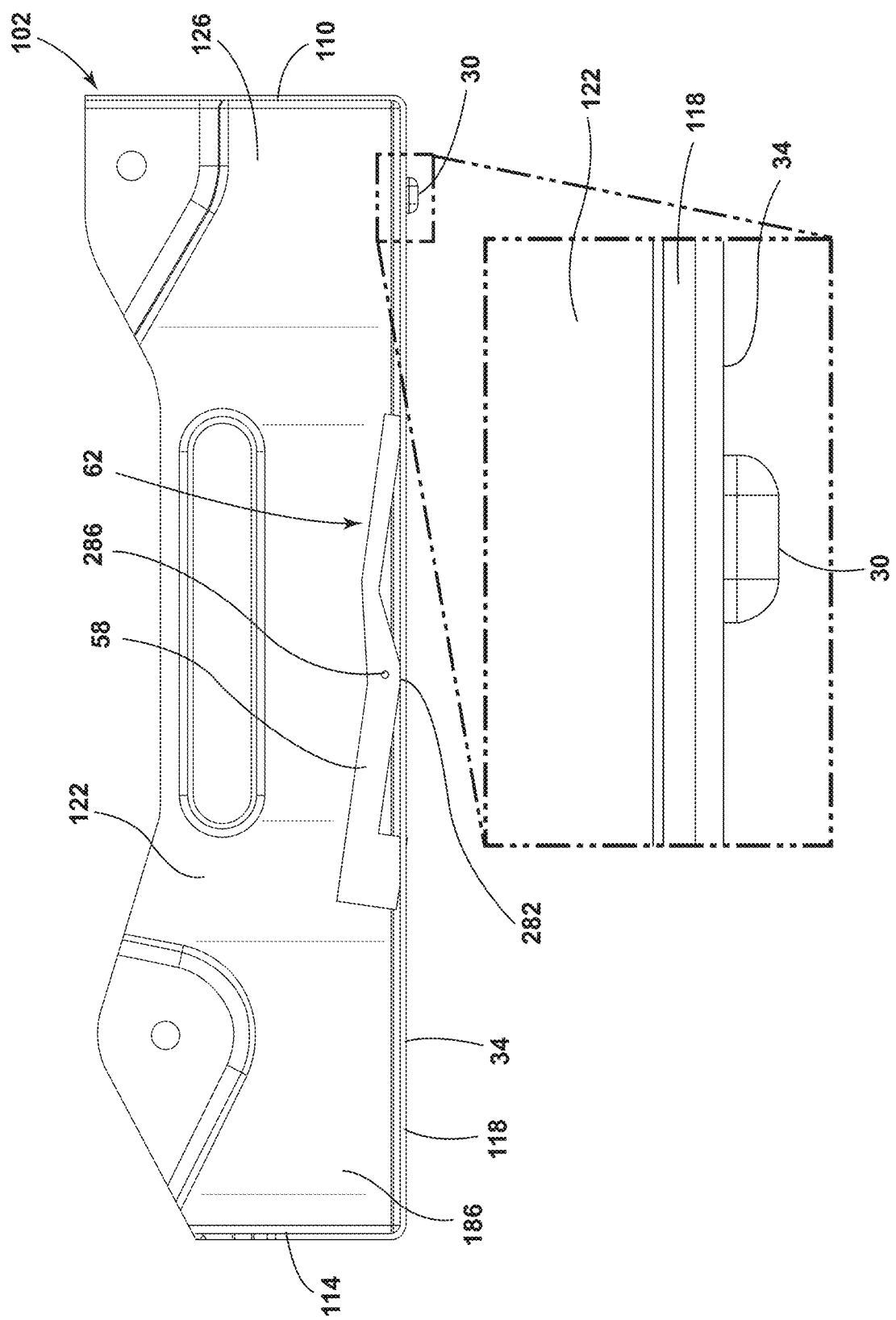
FIG. 4 is a side elevation view of a carriage bracket of a seating assembly with an electrical connector and a locating protrusion, according to the present disclosure.

Referring to FIGS. 3 and 4, the carriage bracket 106 may define the locating protrusion 30 that extends from the bottom surface 34 thereof. The rail cartridge 46 may define the locating hole 50 to the upper wall 146 thereof to receive the locating protrusion 30. The carriage bracket 106 may be positioned on an upper surface 206 of the rail cartridge 46 with the locating protrusion 30 extending through the locating hole 50. This arrangement may be advantageous for proper alignment of the carriage bracket 106 with the rail cartridge 46.

Figure 5:
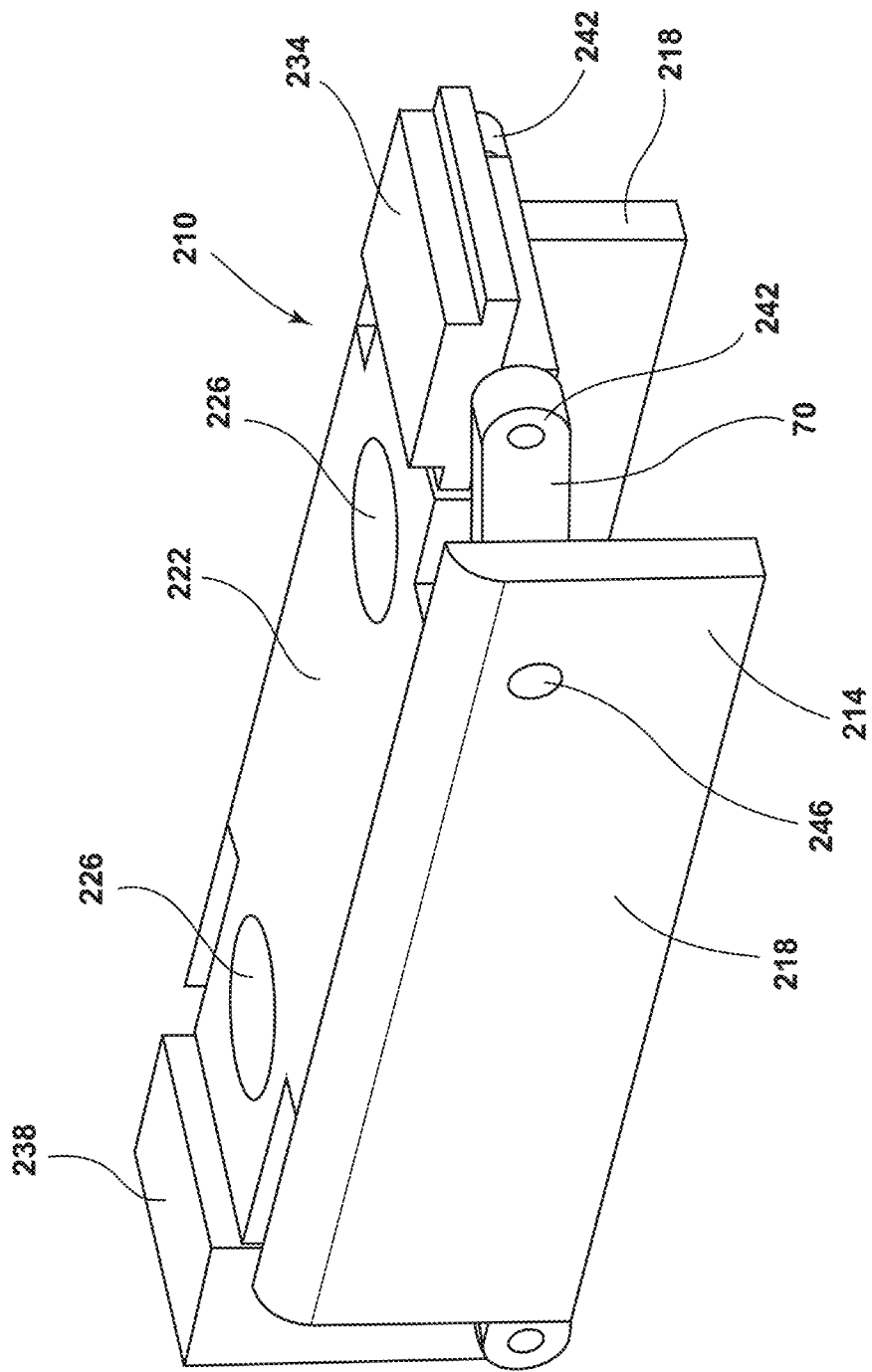
FIG. 5 is a side perspective view of an actuation assembly for a rail cartridge for a seating assembly, according to the present disclosure.
Figure 6:
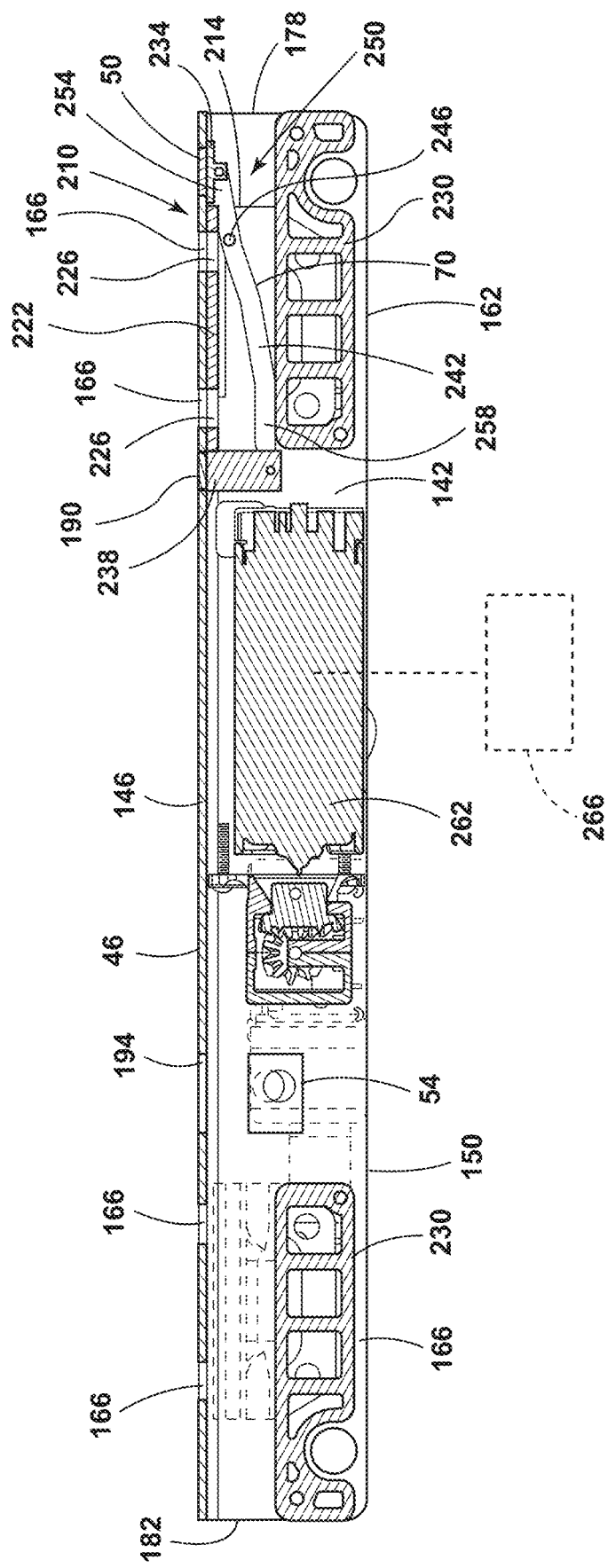
FIG. 6 is a cross-sectional view of an interface between a rail cartridge and a carriage bracket of a seating assembly, according to the present disclosure.
Figure 7:
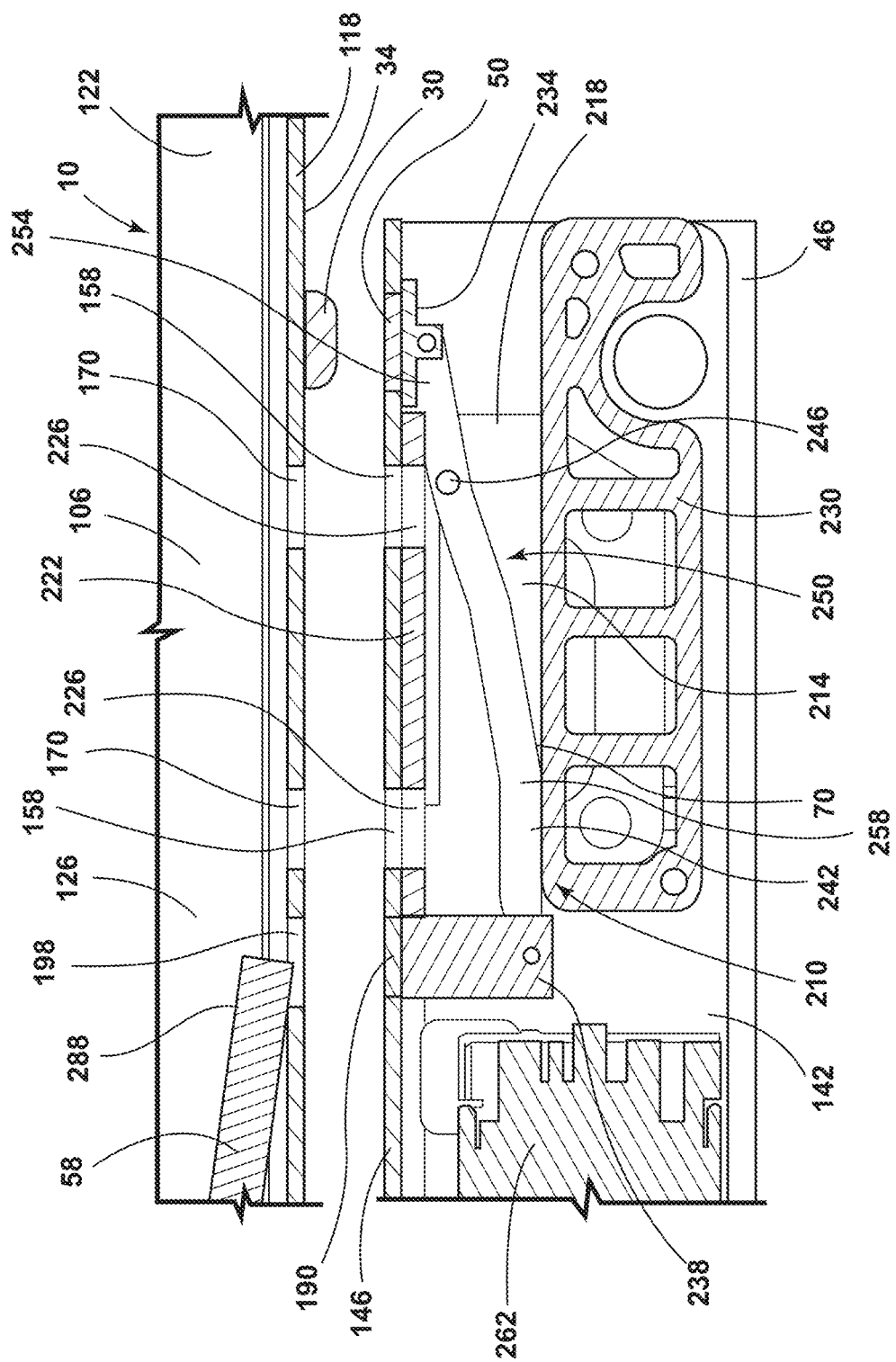
FIG. 7 is a partial cross-sectional view of an interface between a rail cartridge and a carriage bracket of a seating assembly, according to the present disclosure.
Figure 8:
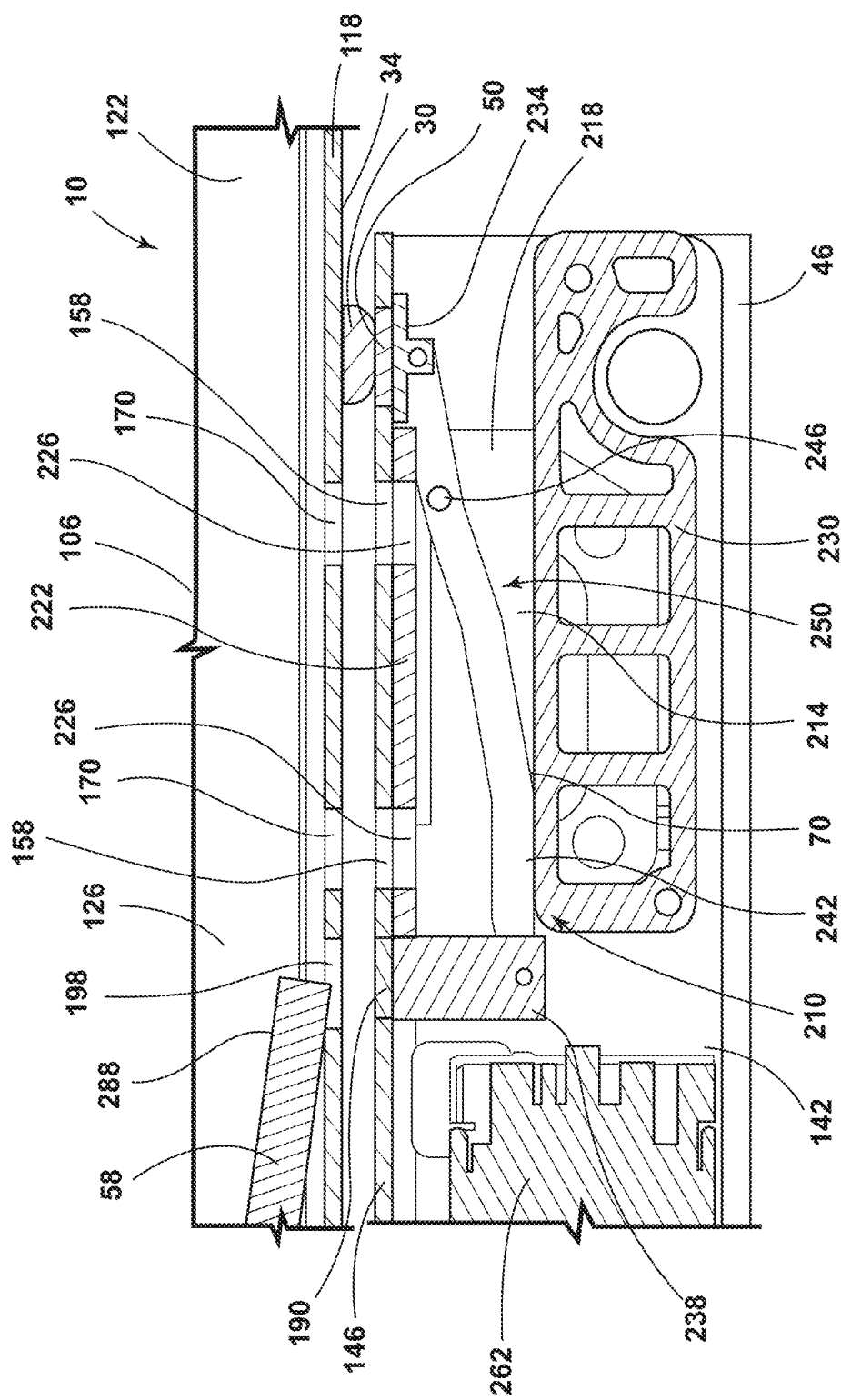
FIG. 8 is a partial cross-sectional view of an interface between a rail cartridge and a carriage bracket of a seating assembly, according to the present disclosure.
Figure 9:
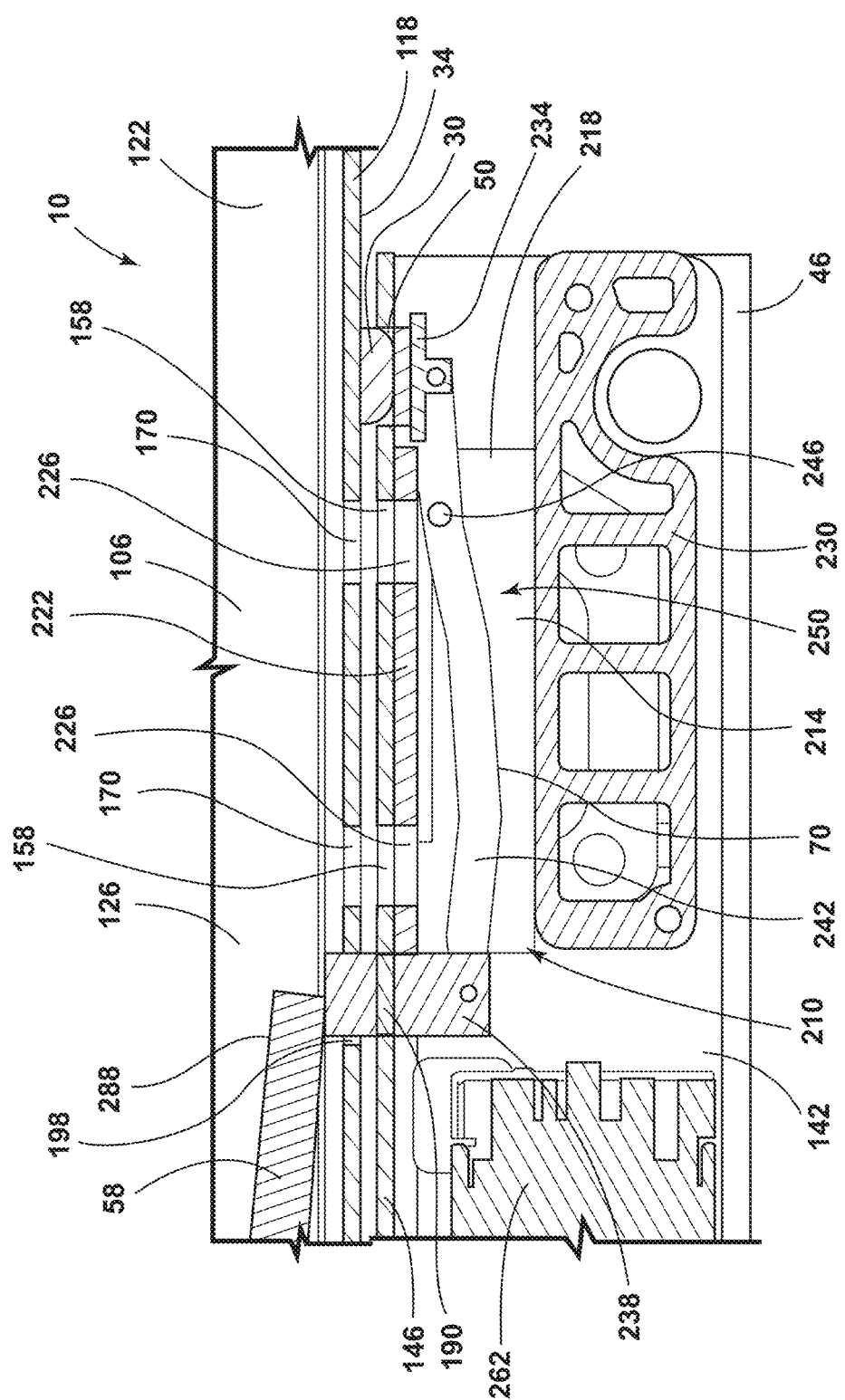
FIG. 9 is a partial cross-sectional view of an interface between a rail cartridge and a carriage bracket of a seating assembly, according to the present disclosure.

Referring to FIGS. 5 and 6, an actuation assembly 210 may be disposed within the channel 142 of the rail cartridge 46. The actuation assembly 210 may include a housing 214 that has opposing outer walls 218 with a connecting upper wall 222 that extends therebetween. In various examples, weld nuts 226 may be integrally formed within the connecting upper wall 222 of the housing 214 for receiving the fasteners 174 (FIG. 3) that extend through the upper wall 146 of the rail cartridge 46. In this way, the actuation assembly 210 may be secured within the rail cartridge 46. In various examples, the actuation assembly 210 may be disposed proximate the first end 178 of the rail cartridge 46. Additionally or alternatively, the rail cartridge 46 may include support structures 230 that are disposed proximate one or both of the first and second ends 178, 182. The actuation assembly 210 may be disposed on the support structure 230 proximate the first end 178 of the rail cartridge 46. It is contemplated that the actuation assembly 210 may be disposed in any practicable location within the rail cartridge 46.

The actuation assembly 210 may include the actuation member 70 that is rotatably coupled to the housing 214. The actuation member 70 may include a first engagement feature 234, a second engagement feature 238, and an elongated support 242 that extends therebetween. The elongated support 242 may be rotatably coupled to one or both of the outer walls 218 of the housing 214. In various examples, the actuation member 70 may include two elongated supports 242 coupled to and extending between the first and second engagement features 234, 238. In such examples, the two elongated supports 242 may be substantially identical. According to various aspects, the elongated support 242 may be rotatably coupled to the housing 214 proximate the first engagement feature 234 and configured to rotate about a pivot point 246. In this way, a distance between the pivot point 246 and the first engagement feature 234 may be less than a distance between the pivot point 246 and the second engagement feature 238. This configuration may be advantageous for multiplying a distance that the second engagement feature 238 travels relative to the distance traveled by the first engagement feature 234 as the actuation member 70 rotates about the pivot point 246.

Figure 10:
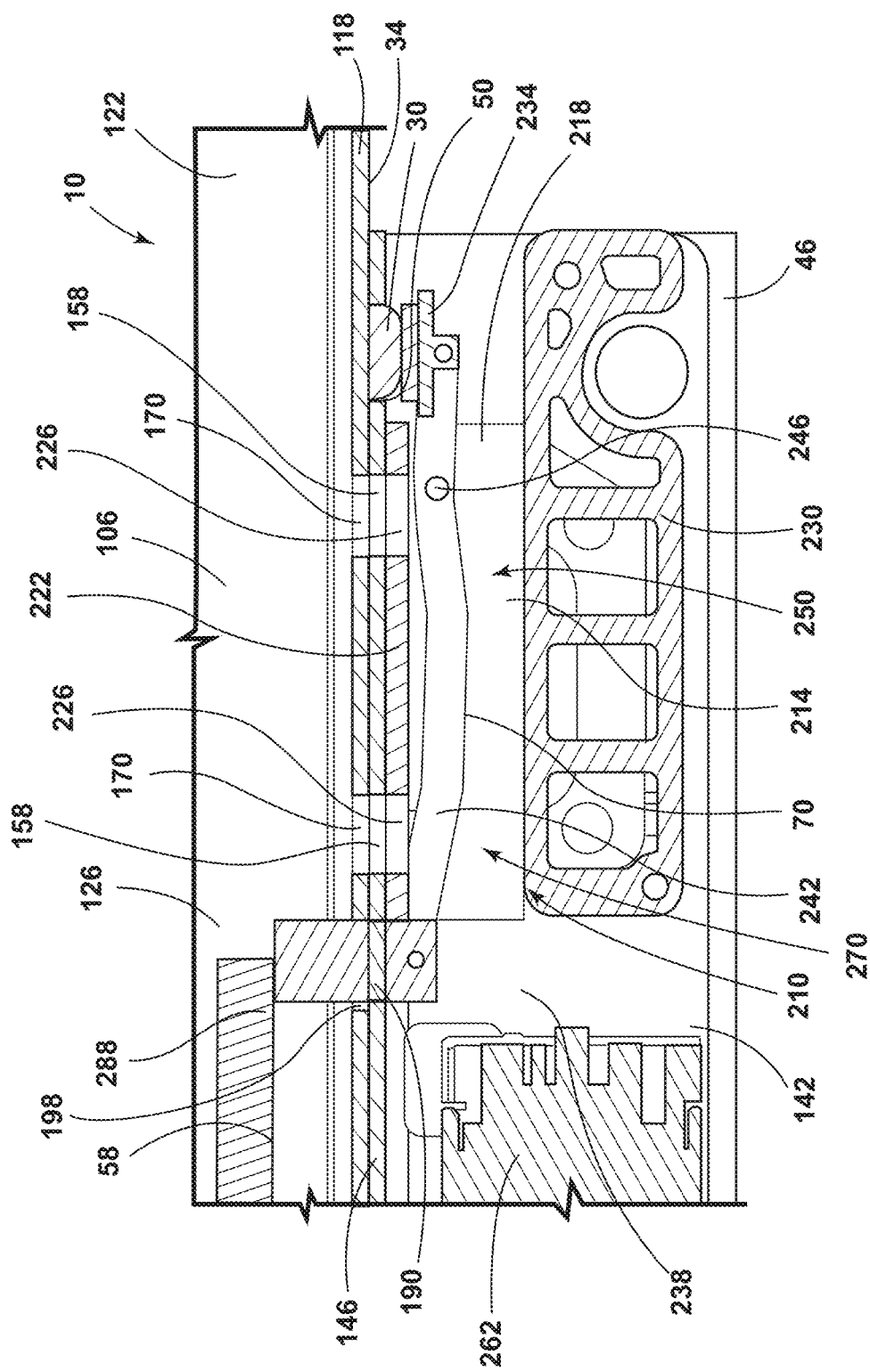
FIG. 10 is a partial cross-sectional view of an interface between a rail cartridge and a carriage bracket of a seating assembly, according to the present disclosure.

As illustrated in FIG. 6, the actuation assembly 210 is disposed on the support structure 230 proximate the first end 178 of the rail cartridge 46. The actuation member 70 may be operable between first and second positions 250, 270 (FIG. 10). In various examples, the first and second positions 250, 270 may be limited by the support structure 230 and the upper wall 146. When in the first position 250, a first end 254 of the actuation member 70 may be spaced-apart from the support structure 230 and a second end 258 may abut the support structure 230. This configuration may be advantageous for limiting the movement of the second end 258 of the actuation member 70. Additionally or alternatively, the second engagement feature 238 may be vertically aligned with the first cartridge aperture 190. When the actuation member 70 is in the first position 250, the second engagement feature 238 may partially extend through the first cartridge aperture 190, may be flush with the bottom wall 118, and/or may not extend through the first cartridge aperture 190. According to various aspects, the first engagement feature 234 may vertically align with the locating hole 50 defined in the upper wall 146 of the rail cartridge 46. In various examples, the first engagement feature 234 may have a width greater than a width of the locating hole 50. This configuration may be advantageous for limiting movement of the first end 254 of the actuation member 70. Stated differently, the first engagement feature 234 may abut the upper wall 146 when in the first position 250.

The first electrical connector 54 may be coupled to the rail cartridge 46. In various examples, the first electrical connector 54 may be disposed within the channel 142 of the rail cartridge 46. Additionally or alternatively, the first electrical connector 54 may vertically align with the second cartridge aperture 194 defined by the upper wall 146 of the rail cartridge 46.

Referring still to FIG. 6, the rail cartridge 46 may include a motor 262 disposed within the channel 142. The motor 262 may be configured to laterally translate the rail cartridge 46 between fore and aft positions along the corresponding track assembly 38 (FIG. 1). The motor 262 may be operably coupled to a controller 266. The controller 266 includes a processor, a memory, and other control circuitry. Instructions or routines relating to various functions are stored in the memory and executed by the processor. The instructions may include at least one instruction for operating the motor 262. For example, the instructions may include operation speeds for the motor 262. The operation speeds may be adjustable via pulse width modulation (PWM) controls. Such PWM controls may be advantageous for adjusting the speed of operation of the motor 262 when the corresponding seating assembly 10 (FIG. 1) is occupied by a passenger. Additionally or alternatively, the PWM controls may provide for the motor 262 to run at a lower duty cycle for slower stops when the seating assembly 10 reaches a selected position. Additionally or alternatively, the controller 266 may be a primary controller 266 for the vehicle 14 (e.g., a vehicle control module, a body control module, etc.) or may be a separate controller 266 for the motor 262. The controller 266 may receive a signal from a user-interface, such that a passenger or occupant of the vehicle 14 (FIG. 1) may control the motor 262, and correspondingly control the position of the seating assembly 10 within the vehicle 14.

Referring to FIGS. 2-6, in examples with two rail cartridges 46, one may be the lead rail cartridge 46 and the other may be the follower rail cartridge 46. The lead rail cartridge 46 may include one or all of the first and second electrical connectors 54, 58 and the motor 262. Alternatively, the follower rail cartridge 46 may include the first and second electrical connectors 54, 58. However, it is contemplated that both rail cartridges 46 may include the motor 262 and the first and second electrical connectors 54, 58.

Figure 11:
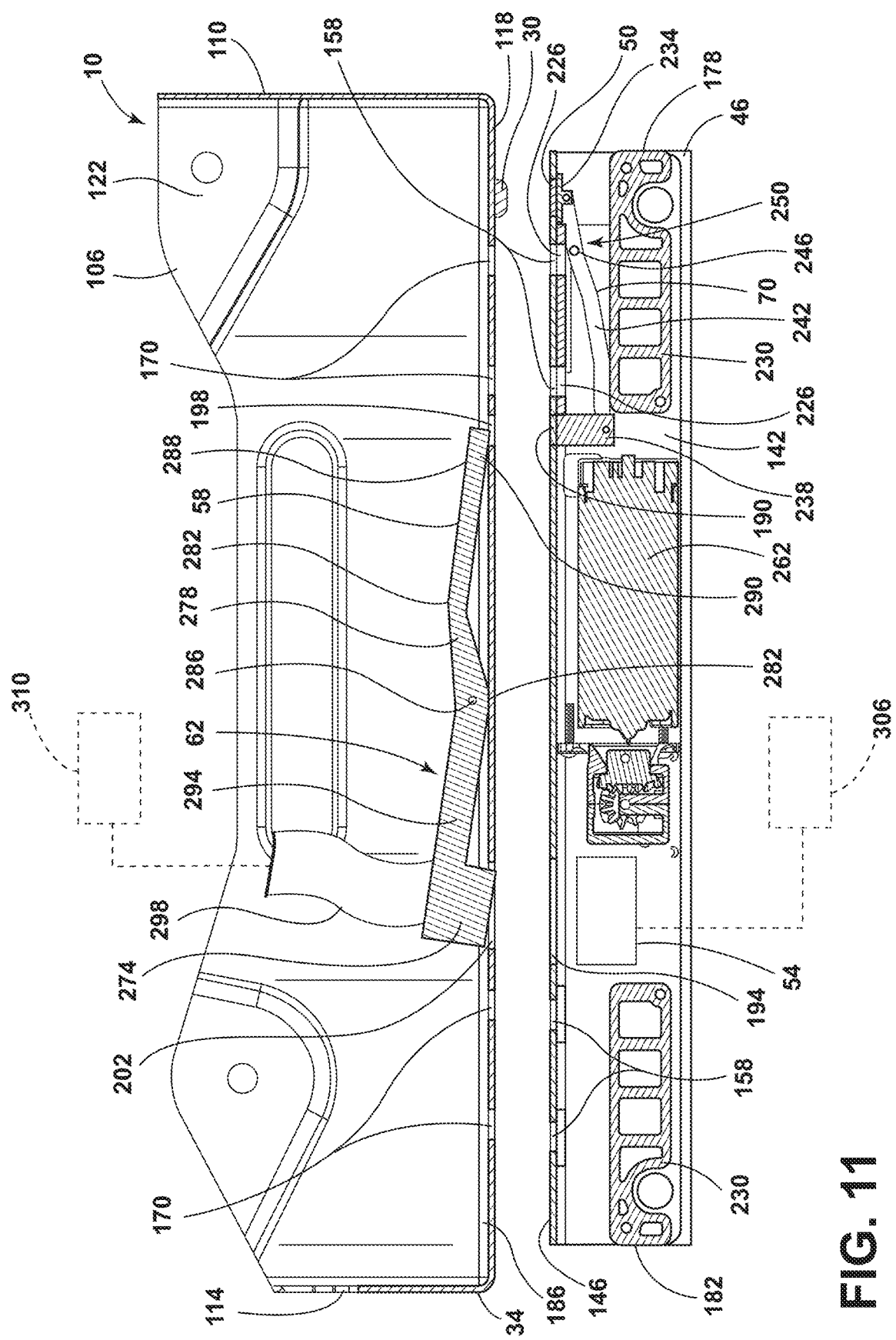
FIG. 11 is a cross-sectional view of an interface between a rail cartridge and a carriage bracket of a seating assembly, according to the present disclosure.
Figure 12:
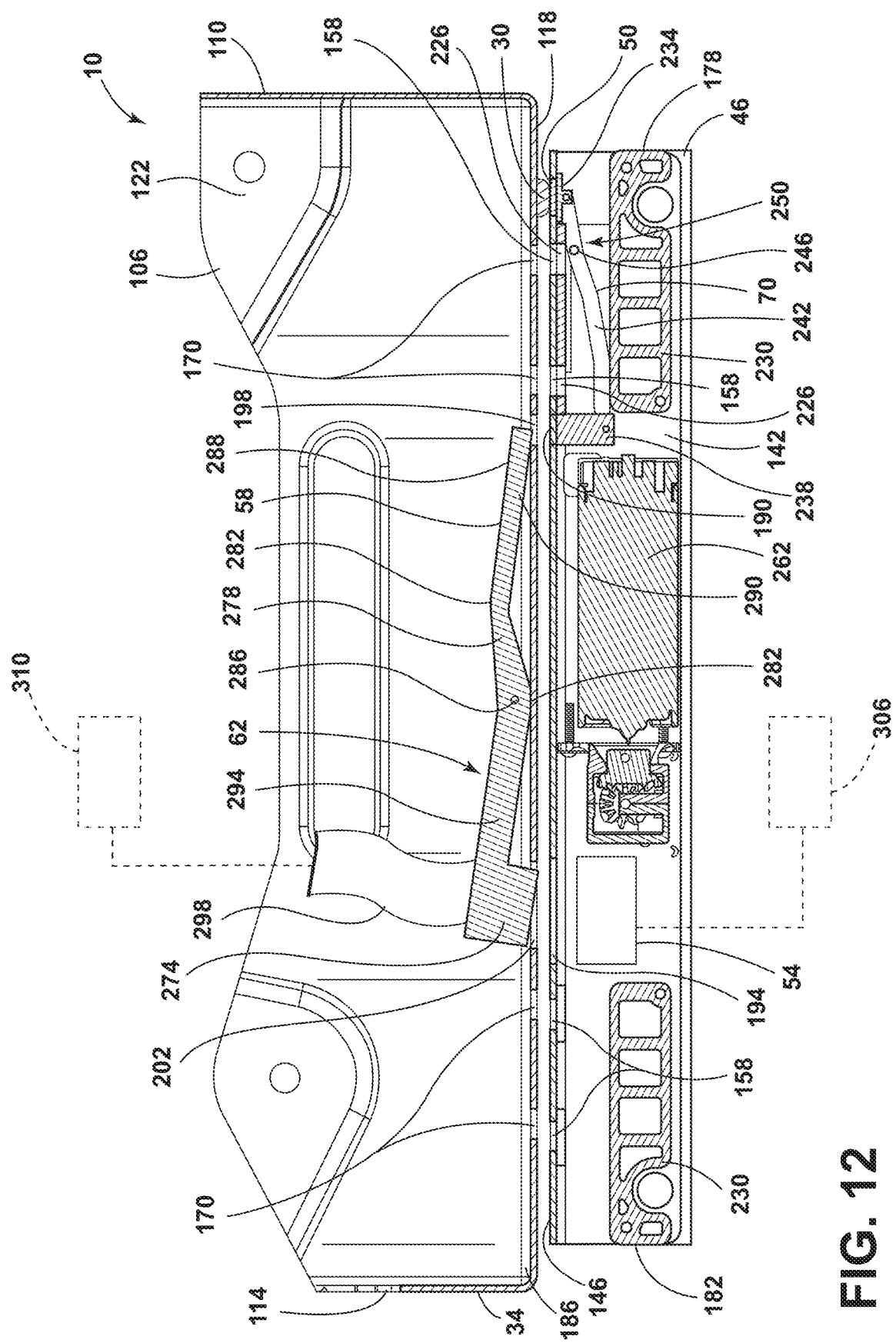
FIG. 12 is a cross-sectional view of an interface between a rail cartridge and a carriage bracket of a seating assembly, according to the present disclosure.
Figure 13:
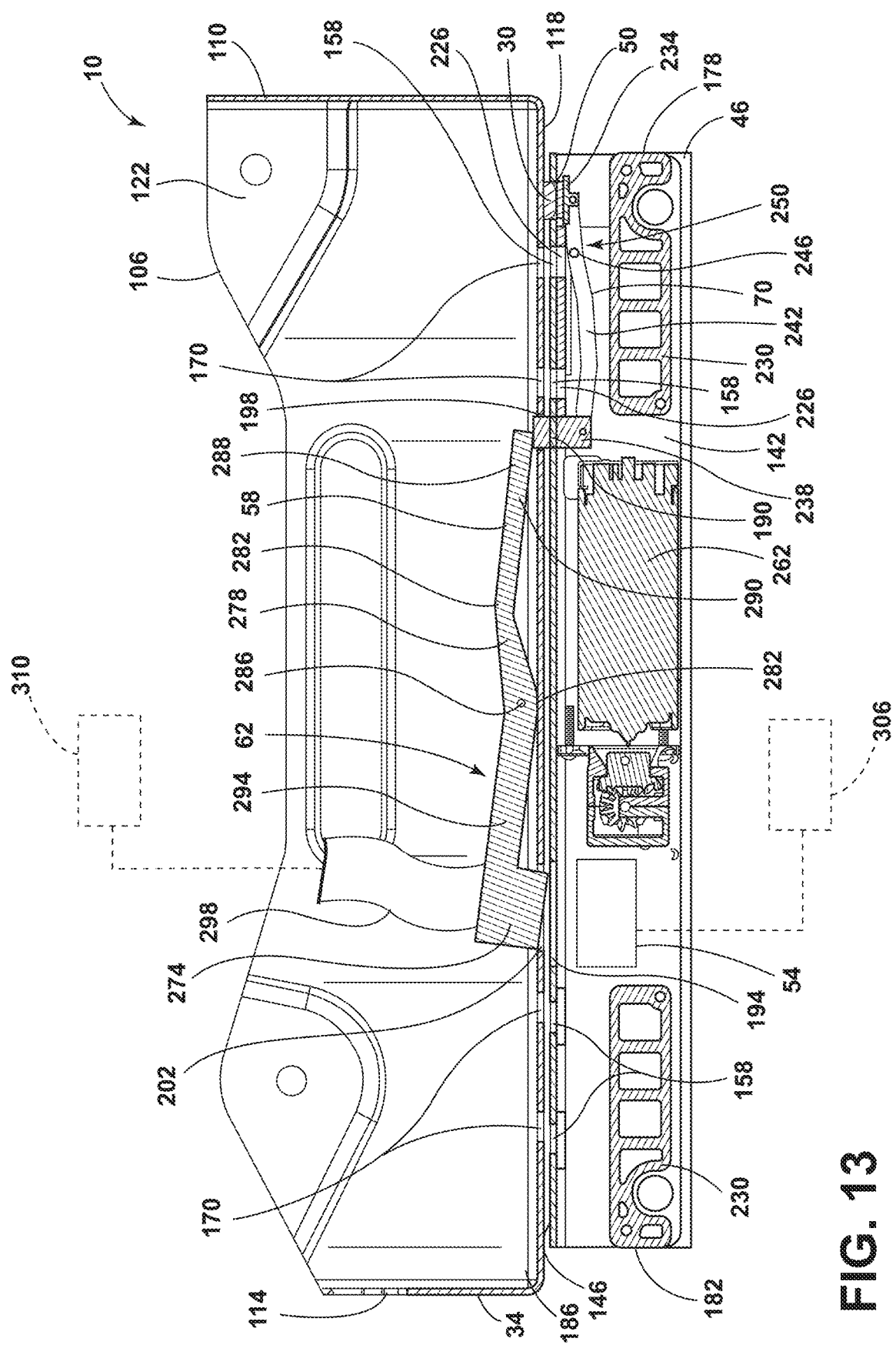
FIG. 13 is a cross-sectional view of an interface between a rail cartridge and a carriage bracket of a seating assembly, according to the present disclosure.
Figure 14:
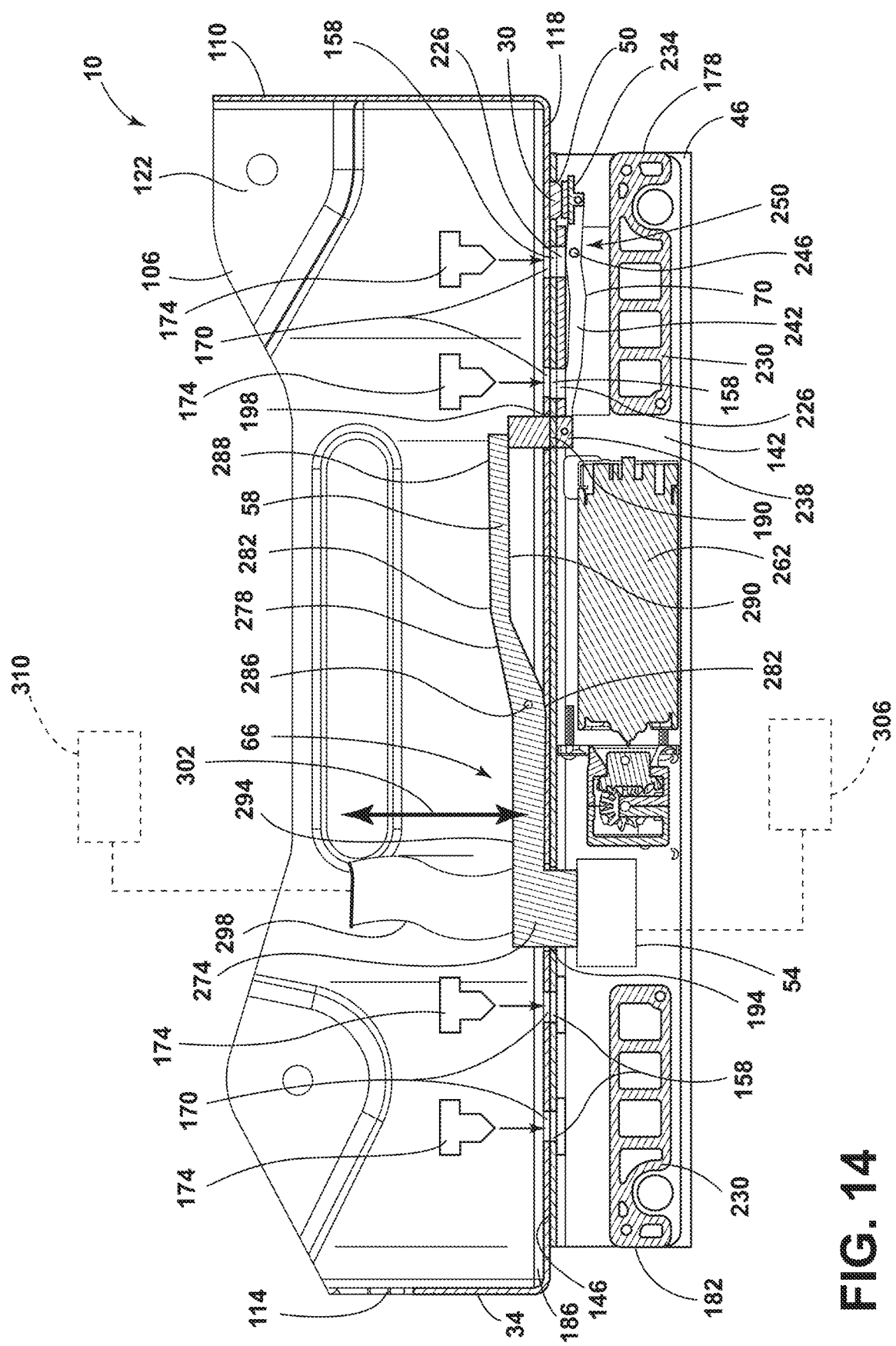
FIG. 14 is a cross-sectional view an interface between a rail cartridge and a carriage bracket of a seating assembly, according to the present disclosure.
Figure 15:
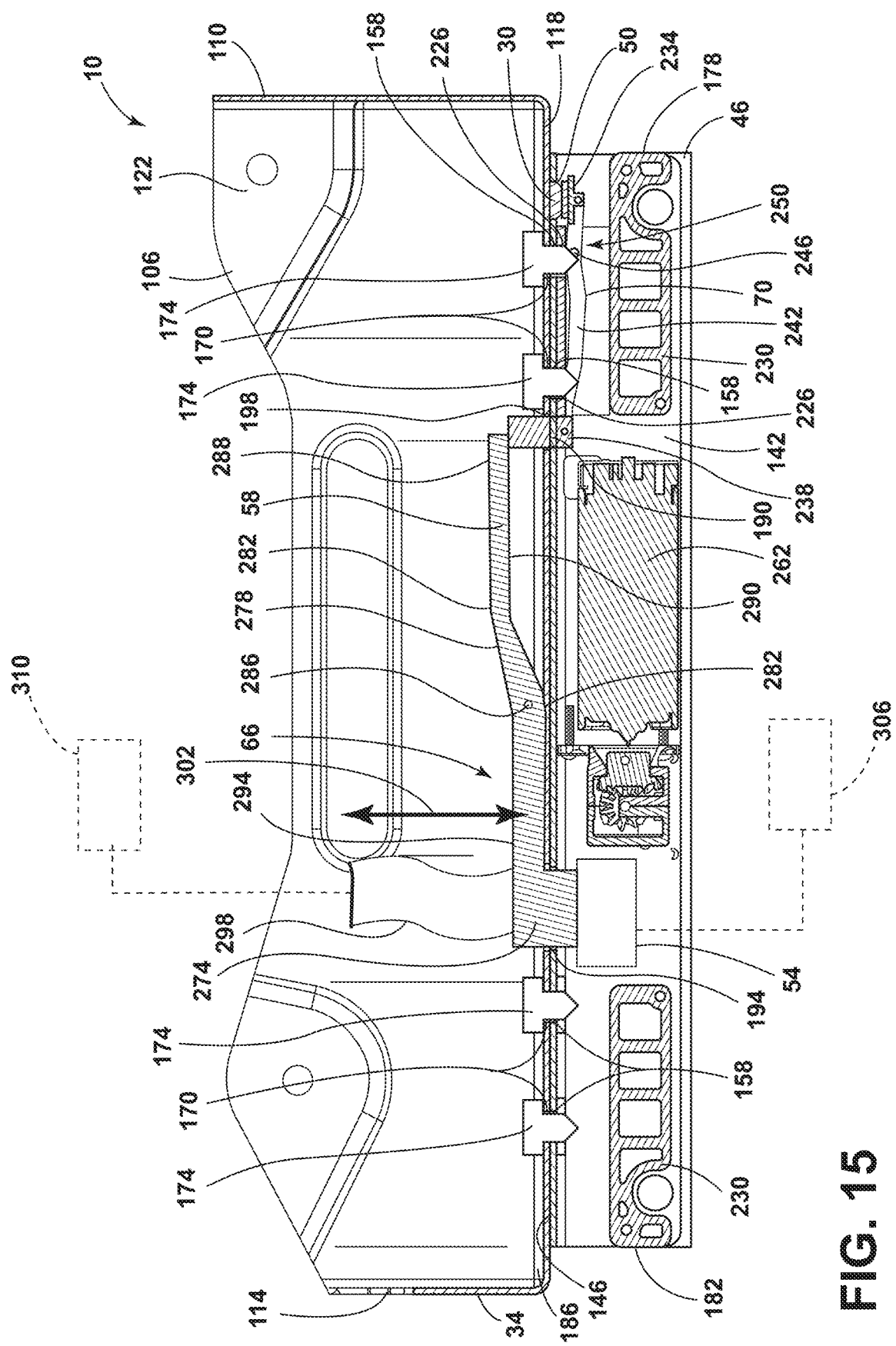
FIG. 15 is a cross-sectional view of an interface between a rail cartridge and a carriage bracket of a seating assembly, according to the present disclosure.

Referring to FIGS. 7-10, the actuation member 70 may be operably coupled to the second electrical connector 58 and configured to move the second electrical connector 58 between the engaged and disengaged position 62, 66 (FIGS. 11 and 15). The seating assembly 10 may include the carriage 22 (FIG. 2), including the carriage bracket 106. The carriage bracket 106 may include the locating protrusion 30 that extends from the bottom surface 34 thereof. As the seating assembly 10 is positioned on the rail cartridge 46, the locating protrusion 30 may align with and be received in the locating hole 50 of the rail cartridge 46. Additionally or alternatively, the first engagement feature 234 of the actuation member 70 may align with the locating hole 50, and accordingly, the locating protrusion 30. The locating protrusion 30 may contact the first engagement feature 234 as the seating assembly 10 is positioned (e.g., lowered) onto the rail cartridge 46.

As the seating assembly 10 is lowered, the locating protrusion 30 may actuate the actuation member 70. Stated differently, the locating protrusion 30 may engage the first engagement feature 234 and displace the first engagement feature 234 downward. As the locating protrusion 30 engages the first engagement feature 234, the actuation member 70 may rotate about the pivot point 246. Prior to engagement between the locating protrusion 30 and the first engagement feature 234, the actuation member 70 may be in the first position 250. The locating protrusion 30 may engage the first engagement feature 234 and may be configured to rotate the actuation member to a second position 270. As the actuation member 70 rotates about the pivot point 246, the first engagement feature 234 may lower and the second engagement feature 238 may correspondingly rise. When in the second position 270, the second engagement feature 238 may be spaced-apart from the support structure 230 within the rail cartridge 46. As the second engagement feature 238 rises with the rotation of the actuation member 70, the second engagement feature 238 may extend through the first cartridge aperture 190 and the corresponding first bracket aperture 198. When the locating protrusion 30 is fully disposed in the locating hole 50, the bottom wall 118 of the carriage bracket 106 may contact the upper wall 146 of the rail cartridge 46, and the actuation member 70 may be in the second position 270. A second end 258 of the actuation member 70 may abut the upper wall 146 when the actuation member 70 is in the second position 270. This configuration may be advantageous for limiting upward movement of the second engagement feature 238 when in the second position 270.

In various examples, the actuation member 70 may be spring-loaded to bias the actuation member 70 to the first position 250. The force of the seating assembly 10 being disposed on the rail cartridge 46 may overcome a biasing force of the spring-loaded actuation member 70 to rotate the actuation member 70 between the first and second positions 250, 270. Stated differently, the actuation member 70 may rotate from the first position 250 to the second position 270 and responds to engagement between the locating protrusion 30 and the actuation member 70. In this way, when the seating assembly 10 is removed from the rail cartridge 46, the locating protrusion 30 may disengage from the actuation member 70 and the actuation member 70 may return to the first position 250. Stated differently, removal of the locating protrusion 30 from the locating hole 50 may allow the actuation member 70 to rotate from the second position 270 to the first position 250.

In a non-limiting example, the locating protrusion 30 may engage the first engagement feature 234 and displace the first engagement feature 234 about 4 mm relative to the first position 250. The about 4 mm depression of the first engagement feature 234 may result in a lift of the second engagement feature 238 of about 13.6 mm. The pivot point 246 being disposed closer to the first engagement feature 234 than the second engagement feature 238 may provide for the displacement of the first engagement feature 234 to multiply the displacement of the second engagement feature 238.

Referring now to FIGS. 11-15, the actuation member 70 may be configured to move the second electrical connector 58 between the engaged and disengaged position 62, 66. When the actuation member 70 is in the first position 250, the actuation member 70 may not engage the second electrical connector 58. As the actuation member 70 moves toward the second position 270, the second engagement feature 238 may engage the second electrical connector 58. This engagement may result in the second electrical connector 58 moving from the disengaged position 66 toward the engaged position 62. In various examples, the second electrical connector 58 may include a connector portion 274 and an elongate arm 278 extending therefrom. The elongate arm 278 may have one or more bends 282, which may be advantageous for assisting in the rotation of the second electrical connector 58. However, it is contemplated that the elongate arm 278, and accordingly the second electrical connector 58, may have any practicable configuration.

When the carriage bracket 106 is not connected to the rail cartridge 46, the second electrical connector 58 may be in the disengaged position 66. In this way, the disengaged position 66 may be a default position of the second electrical connector 58. The second electrical connector 58 may be spring-loaded, such that the second electrical connector 58 may be biased toward the disengaged position 66. When in the disengaged position 66, the elongate arm 278 of the second electrical connector 58 may extend over the first bracket aperture 198. Additionally or alternatively, the connector portion 274, may be disposed over, and/or partially through, the second bracket aperture 202 when the second electrical connector 58 is in the disengaged position 66. The second electrical connector 58 may be rotatably coupled to the carriage bracket 106. In various examples, the second electrical connector 58 may be rotatably coupled to the bracket sidewall 122. The second electrical connector 58 may be configured to rotate about a pivot point 286 between the disengaged position 66 and the engaged position 62.

As the carriage bracket 106, and accordingly the associated seating assembly 10, is lowered onto the carriage bracket 106, the locating protrusion 30 may be received in the locating hole 50 to engage the first engagement feature 234 of the actuation member 70. In this way, the locating protrusion 30 may apply a force to the first engagement feature 234 of the actuation member 70. As previously explained, the engagement between the locating protrusion 30 and the first engagement feature 234 may cause rotation of the actuation member 70 from the first position 250 to the second position 270. As the actuation member 70 rotates to the second position 270, the second engagement feature 238 may move upward through the first cartridge aperture 190 and the corresponding first bracket aperture 198 to engage the elongate arm 278 of the second electrical connector 58. As the actuation member 70 continues to rotate toward the second position 270, the second engagement feature 238 may continually lift an end 288 of the elongate arm 278 to rotate the second electrical connector 58 about the pivot point 286. In this way, the rotation of the actuation member 70 may overcome a biasing force of the spring-loaded second electrical connector 58.

According to various aspects, the actuation member 70 may continue to rotate until the actuation member 70 reaches the second position 270. When the actuation member 70 is in the second position 270, the second electrical connector 58 may be in the engaged position 62. When in the engaged position 62, a first portion 290 that includes the end 288 of the elongate arm 278 may be spaced-apart from the bottom wall 118 of the carriage bracket 106 by the engagement with the second engagement feature 238. A second portion 294 on an opposing side of the pivot point 286 relative to the first portion 290 of the elongate arm 278, may contact and/or abut the bottom wall 118 of the carriage bracket 106 when the second electrical connector 58 is in the engaged position 62. The bends 282 may provide for various configurations of the elongate arm 278. The contact between the second portion 294 of the elongate arm 278 and the bottom wall 118 may prevent over-rotation of the second electrical connector 58. Additionally or alternatively, the contact between the elongated support 242 of the actuation member 70 and the upper wall 146 of the rail cartridge 46 may contribute to the prevention of the over-rotation of the second electrical connector 58 by preventing over-rotation of the actuation member 70.

Referring still to FIGS. 11-15, the second electrical connector 58 may extend through the second bracket aperture 202 and the corresponding second cartridge aperture 194 to extend into the channel 142 of the rail cartridge 46 when in the engaged position 62. According to various aspects, when in the engaged position 62, the second electrical connector 58 may engage the first electrical connector 54. The engagement between the first and second electrical connectors 54, 58 may produce an electrical connection between the rail cartridge 46 and the seating assembly 10. The second electrical connector 58 may be coupled to a wiring harness 298. The electrical connection between the first and second electrical connectors 54, 58 may allow power and/or data 302 to be transferred between the rail cartridge 46 and the seating assembly 10 (FIG. 1). Additionally or alternatively, the second electrical connector 58 may include float tolerances. In this way, the second electrical connector 58 may assist in preventing and/or correcting misalignment between the first and second electrical connectors 54, 58. The seating assemblies 10 may be secured to the rail cartridge 46 via the fasteners 174. This configuration may retain the electrical connection between the rail cartridge 46 and the seating assembly 10 until the seating assembly 10 is removed from the rail cartridge 46.

In various examples, the first electrical connector 54 may be operably coupled to a bus bar 306. The bus bar 306 may be, for example, a lead frame bus bar 306 that provides an electric current to the track assembly 38. The second electrical connector 58 may be operably coupled to a seat control module 310 within the seating assembly 10 via the wiring harness 298. In this way, the electric current may be transferred from the bus bar 306, through the first and second electrical connectors 54, 58, through the wiring harness 298, and to the seat control module 310, thereby providing the electrical connection between the vehicle 14 and the seating assembly 10.

Referring still to FIGS. 11-15, the seating assembly 10 may be removed from the rail cartridge 46 which may disrupt the electrical connection between the vehicle 14 and the seating assembly 10. The fasteners 174 may be removed from the receiving holes 158, 170. The seating assembly 10 may then be lifted off of the rail cartridge 46. As the seating assembly 10 is lifted, the carriage bracket 106 may be separated from the rail cartridge 46. Additionally or alternatively, the locating protrusion 30 may be removed from the locating hole 50. Without the engagement between the locating protrusions 30 in the first engagement feature 234, the actuation member 70 may rotate from the second position 270 to the first position 250. As the actuation member 70 rotates toward the first position 250, the second engagement feature 238 may lower, which may result in the second electrical connector 58 rotating from the engaged position 62 toward the disengaged position 66. The rotation of the second electrical connector 58 to the disengaged position 66 disengages the second electrical connector 58 from the first electrical connector 54. In this way, the electrical connection may be established utilizing the install motion of the seating assembly 10 to the rail cartridge 46 and may be disrupted by removing the seating assembly 10.

The first and second electrical connectors 54, 58 are mating connectors. In this way, the first electrical connector 54 may be a female connector and the second electrical connector 58 may be a male connector. Alternatively, the first electrical connector 54 may be the male connector and the second electrical connector 58 may be the female connector. It is contemplated that the first and second electrical connectors 54, 58 may be any mating connectors that establish the electrical connection.

Figure 16:
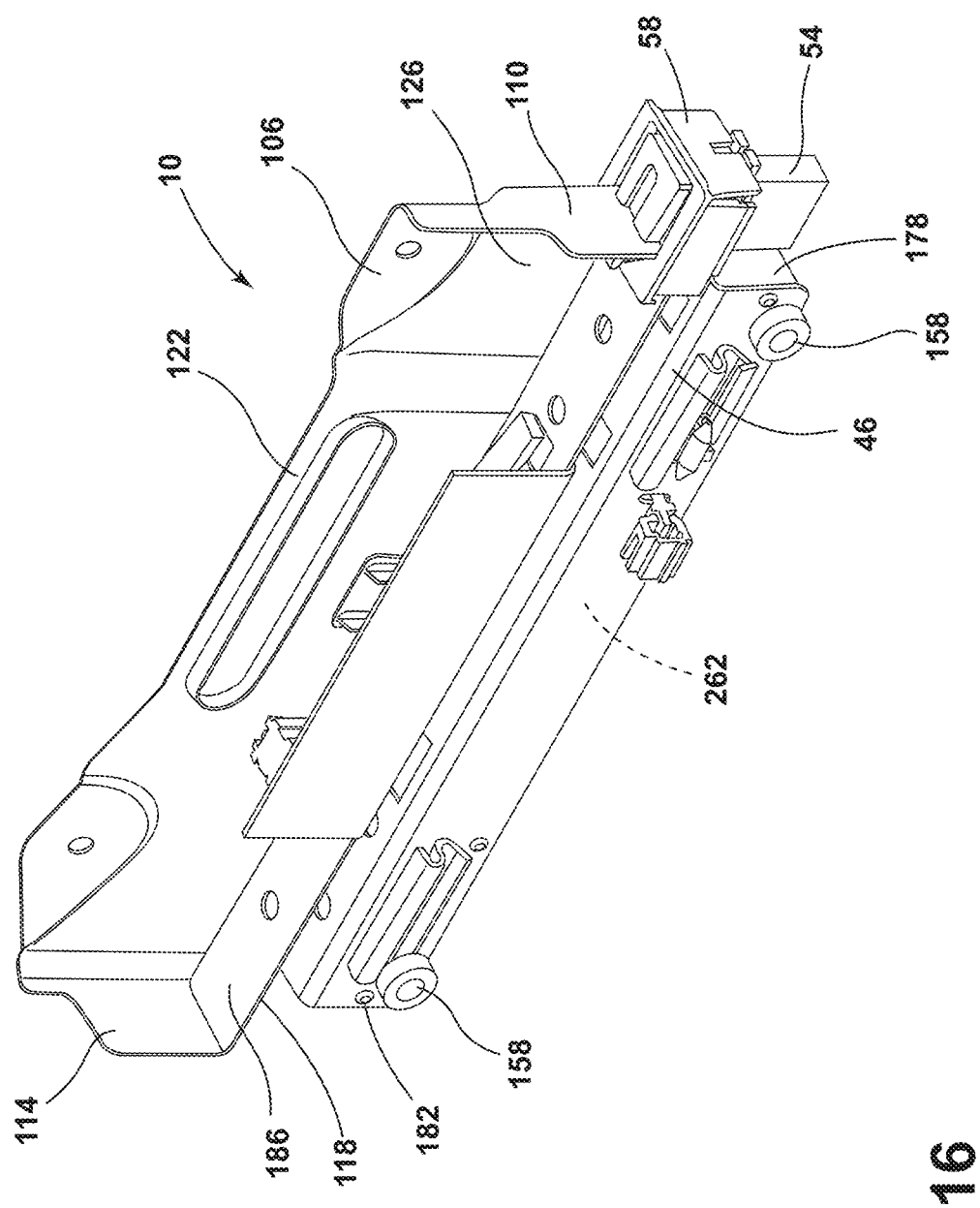
FIG. 16 is a side perspective view of a carriage bracket and a rail cartridge, according to the present disclosure.
Figure 17:
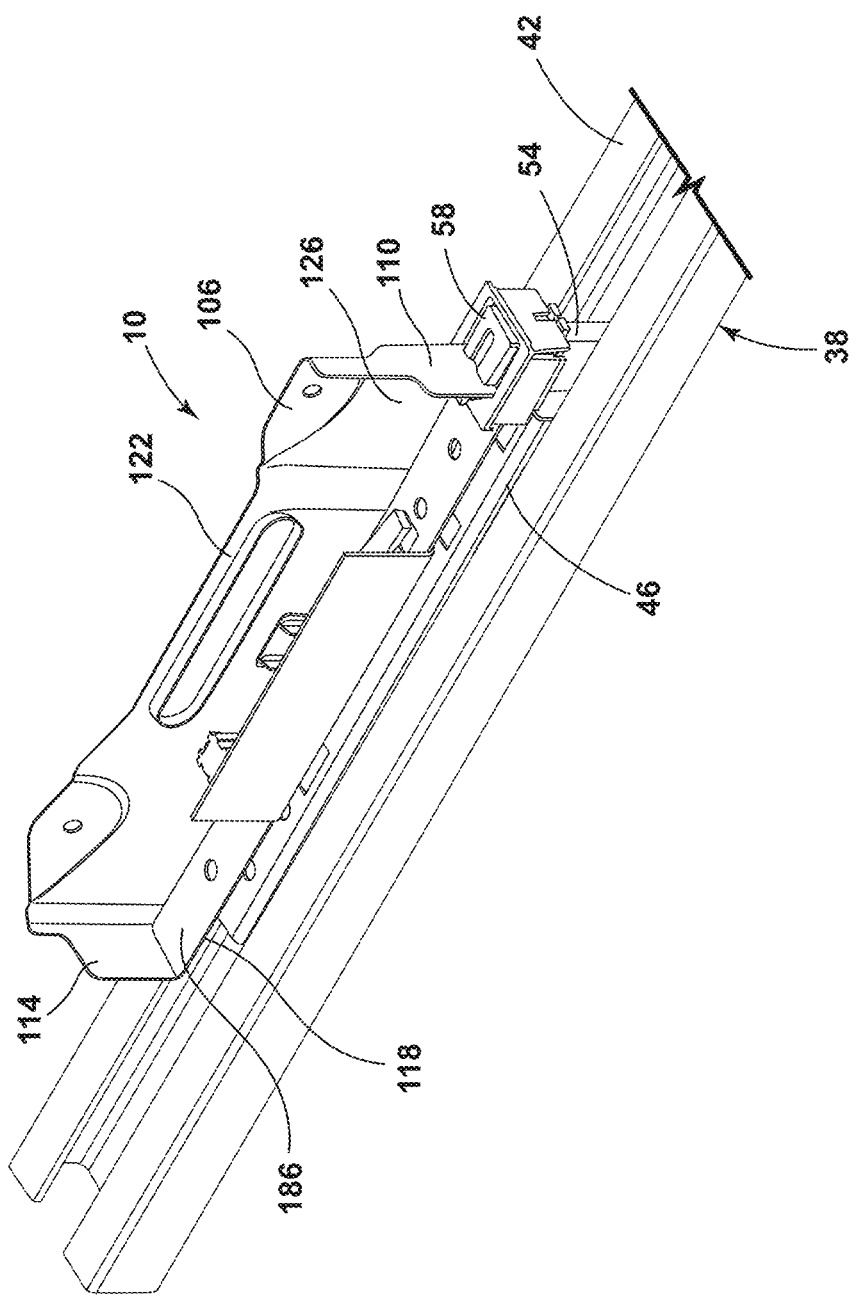
FIG. 17 is a side perspective view of a rail cartridge within a track assembly, according to the present disclosure.
Figure 18:
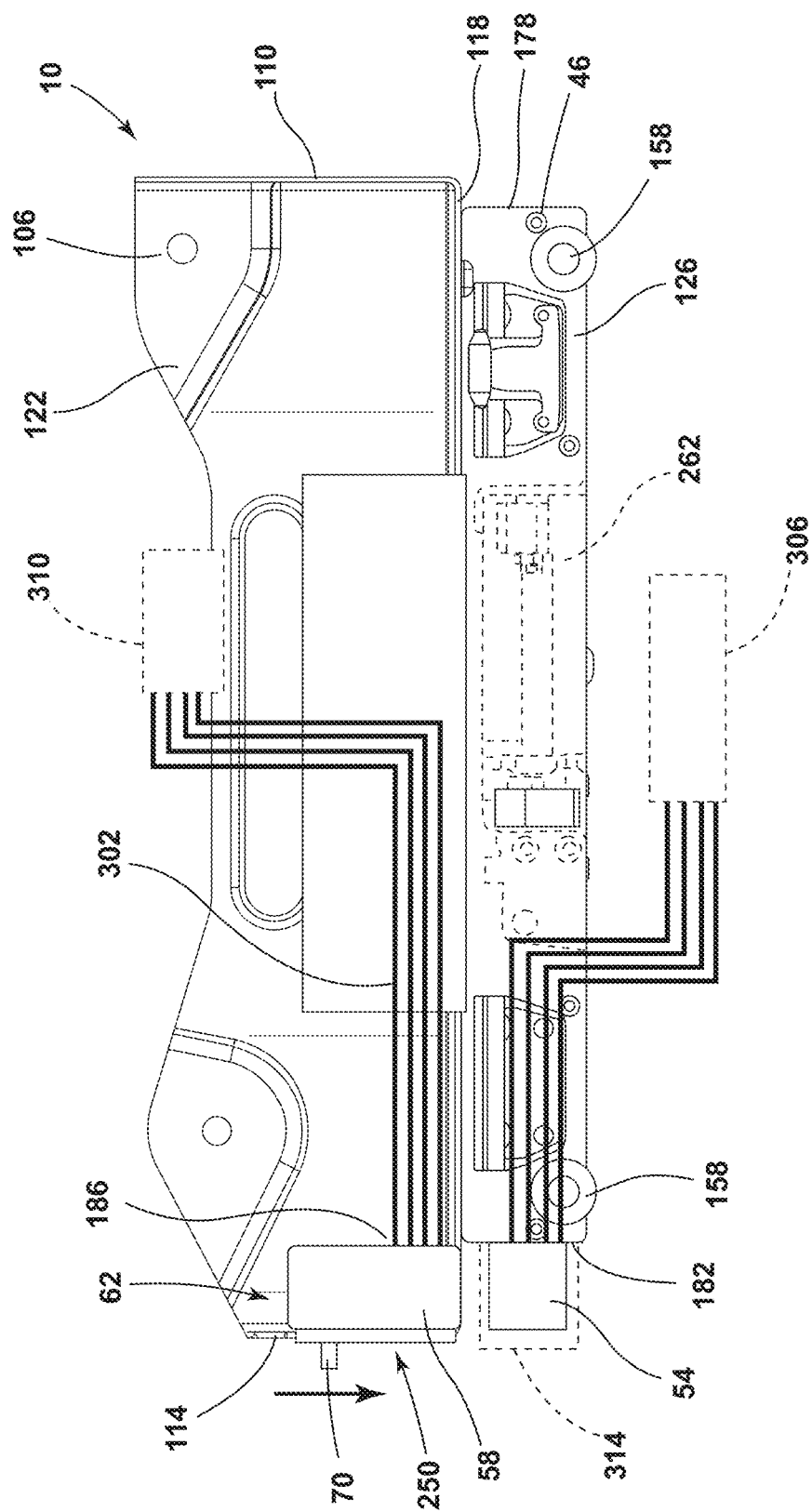
FIG. 18 is a cross-sectional view of an interface between a rail cartridge and a carriage bracket of a seating assembly, according to the present disclosure.
Figure 19:
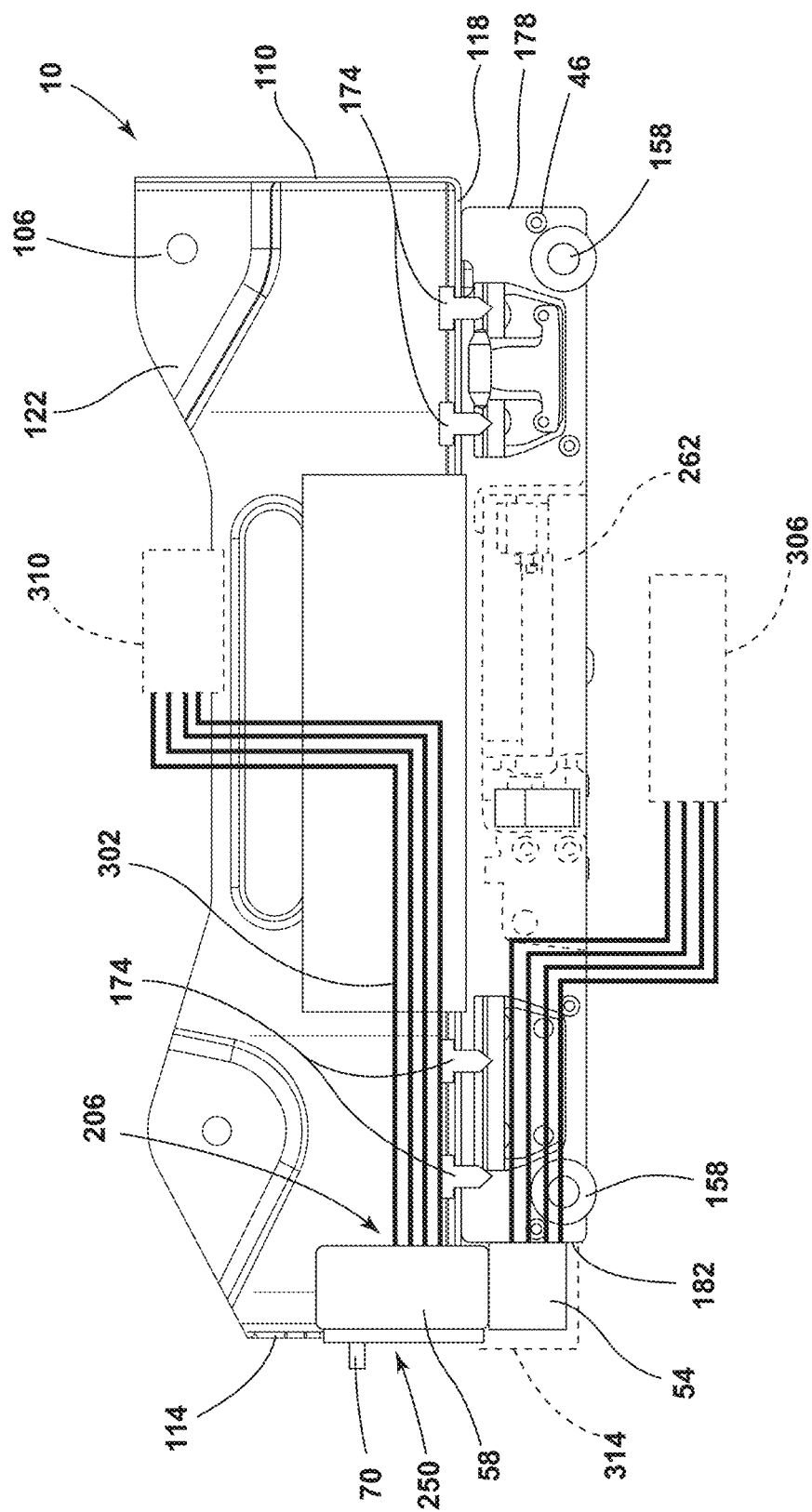
FIG. 19 is a cross-sectional view of an interface between a rail cartridge and a carriage bracket of a seating assembly, according to the present disclosure.

Referring to FIGS. 16 and 17, an additional and/or alternative configuration of the first and second electrical connectors 54, 58 is illustrated. The first electrical connector 54 may be coupled to the rail cartridge 46. In various examples, the first electrical connector 54 may be coupled to the first end 178 of the rail cartridge 46. The first electrical connector 54 may extend outwardly from the first end 178 of the rail cartridge 46. According to various aspects, the first electrical connector 54 may have a width less than a width of the rail cartridge 46. In this way, the first electrical connector 54 does not impede the movement of the rail cartridge 46 as the rail cartridge 46 translates along the track assembly 38.

The second electrical connector 58 may be coupled to the first bracket end wall 110. In various examples, the second electrical connector 58 may be at least partially disposed within the cavity 126 of the carriage bracket 106. Additionally or alternatively, the second electrical connector 58 may extend outward away from the first bracket end wall 110 of the carriage bracket 106. The second electrical connector 58 may be fixedly coupled to the carriage bracket 106, or alternatively, may be moved between the engaged and disengaged position 62, 66 (FIGS. 11 and 14) by the actuation member 70 (FIG. 3). The engagement between the first and second electrical connectors 54, 58 may correspond with the install motion of the seating assembly 10 with the rail cartridge 46. This way, as the seating assembly 10 is coupled with the rail cartridge 46, the carriage bracket 106 may couple with the rail cartridge 46. The second electrical connector 58 may align with the first electrical connector 54 and simultaneously engage with the first electrical connector 54 as the carriage bracket 106 engages the rail cartridge 46. It is contemplated that the first and second electrical connectors 54, 58 may be disposed in any practicable location on the carriage bracket 106 and the rail cartridge 46, respectively. This configuration may be advantageous for decreasing the size of the rail cartridge 46.

Referring to FIGS. 18-21, an additional and/or alternative configuration of the first and second electrical connectors 54, 58 is illustrated. In various examples, a spacer 314 may be coupled to the second end 182 of the rail cartridge 46. The spacer 314 may increase the length of the rail cartridge 46. The first electrical connector 54 may be disposed and/or integrated within the spacer 314. In this way, the first electrical connector 54 may be coupled to the rail cartridge 46. The spacer 314 may include any practicable materials such as, for example, plastic materials. However, it is also contemplated that the spacer 314 may include similar materials to those of the rail cartridge 46.

The second electrical connector 58 may be disposed within the cavity 126 of the carriage bracket 106. According to various aspects, the second electrical connector 58 may be disposed proximate the second bracket end wall 114. Additionally or alternatively, the second electrical connector 58 may be disposed in the overhang portion 186 of the carriage bracket 106. In this way, the overhang portion 186 may vertically align with the spacer 314 coupled to the rail cartridge 46. The bottom wall 118 of the carriage bracket 106 may define a bracket aperture 318. The second electrical connector 58 may be disposed within the carriage bracket 106 and align with the bracket aperture 318. The bracket aperture 318 may be similar to the first and/or second bracket apertures 198, 202 (FIG. 3).

The locating protrusion 30 may extend from the bottom surface 34 (FIG. 4) of the carriage bracket 106 and may be received within the locating hole 50 (FIG. 3) defined by the rail cartridge 46. As the carriage bracket 106 is coupled with the rail cartridge 46, the second electrical connector 58 may vertically align with the first electrical connector 54 coupled with the rail cartridge 46. The second electrical connector 58 may be in the disengaged position 66 when the carriage bracket 106 is initially coupled to the rail cartridge 46. The actuation member 70 may move the second electrical connector 58 to the engaged position 62, thereby providing the electrical connection therebetween. In various examples, the actuation member 70 may lower the second electrical connector 58 until it engages with the first electrical connector 54.

Figure 20:
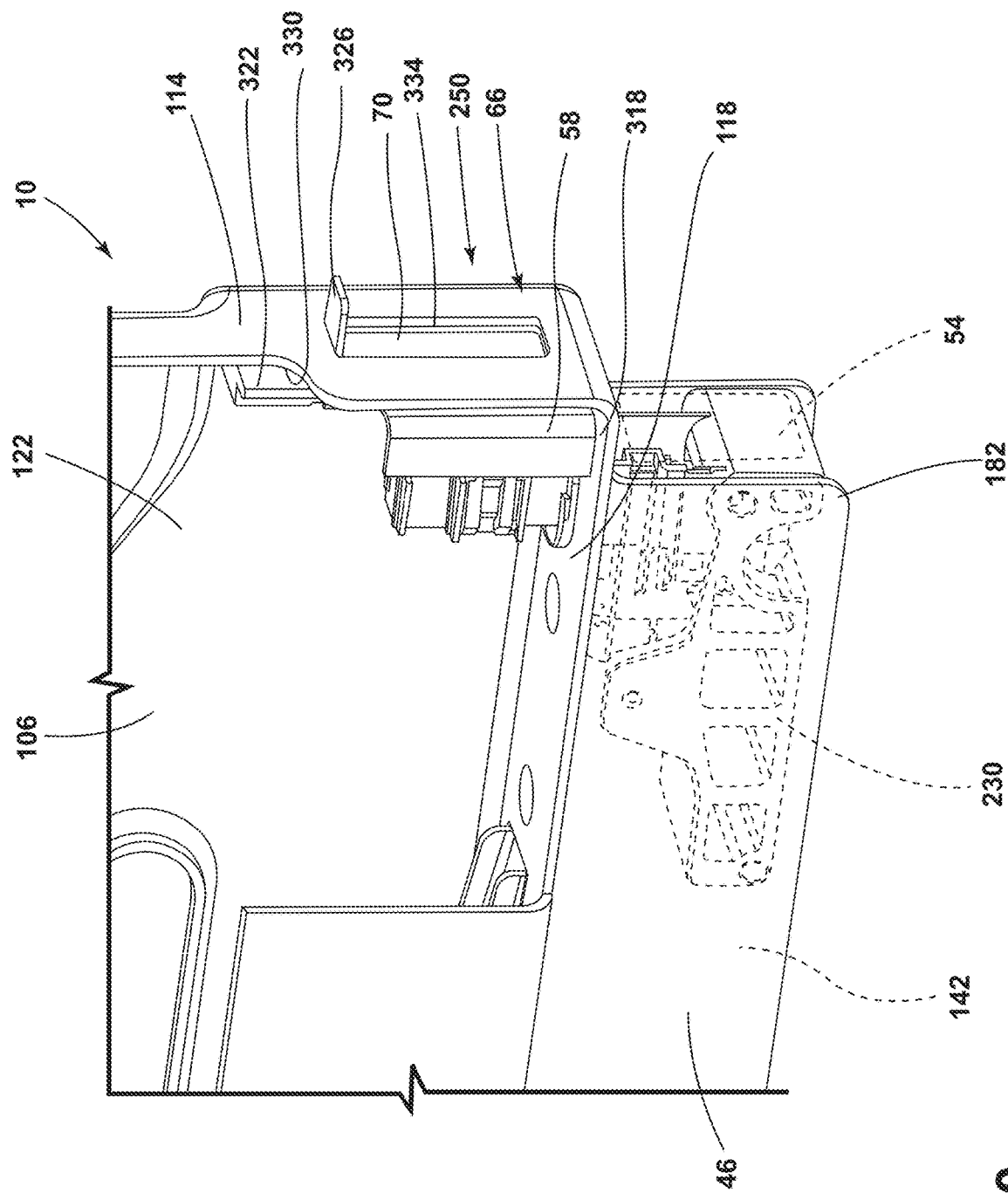
FIG. 20 is a side perspective view of an electrical connector and an actuation member of a carriage bracket, according to the present disclosure.
Figure 21:
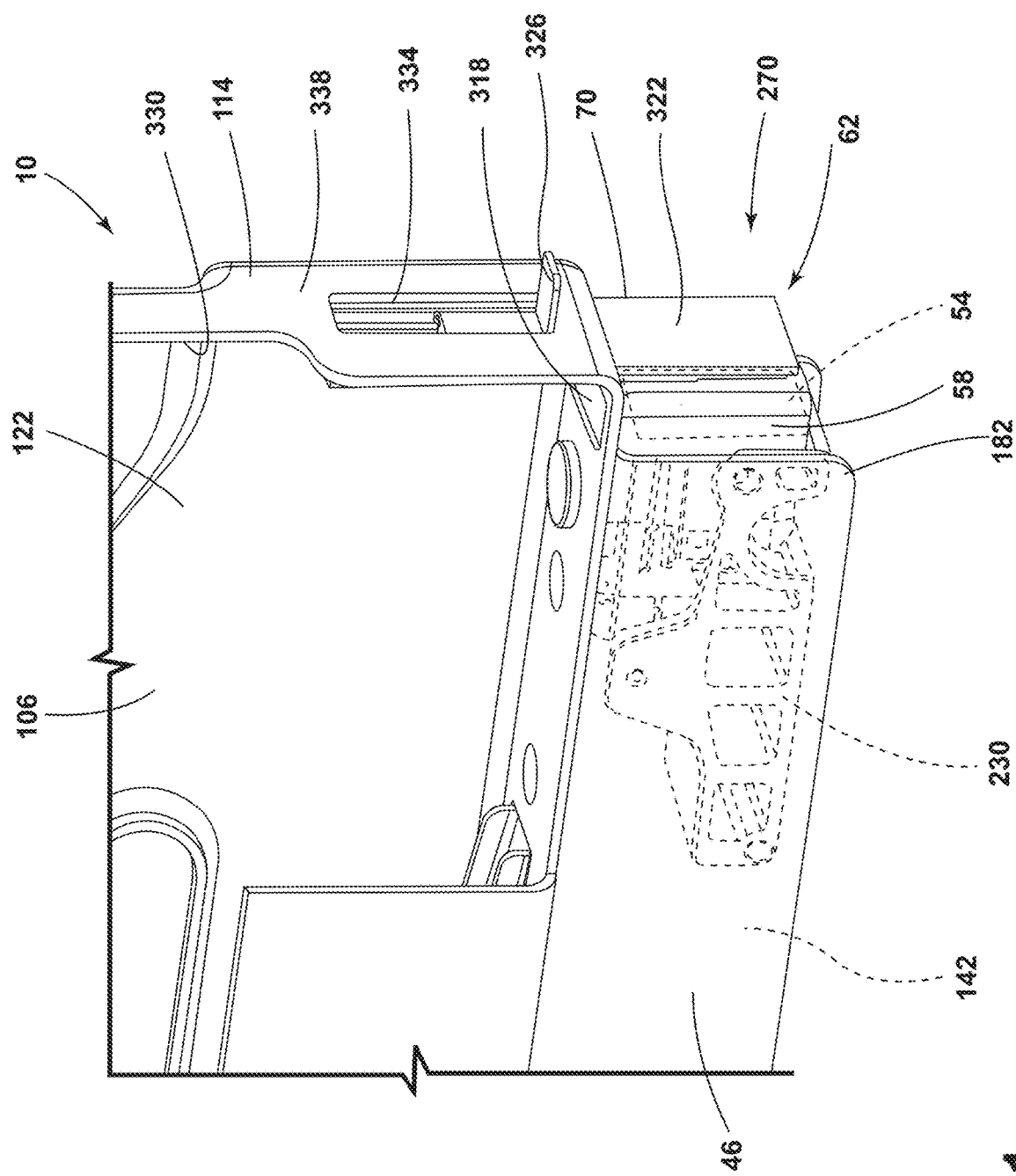
FIG. 21 is a side perspective view of the electrical connector and the actuation member of FIG. 20 in an engaged position.

Referring to FIGS. 20 and 21, the actuation member 70 may be operable between the first and second positions 250, 270. The first position 250 may be a raised position and the second position 270 may be a lowered position. In various examples, the actuation member 70 may include a base 322 and a tab 326 extending therefrom. The base 322 may be disposed within the cavity 126 defined by the carriage bracket 106. In this way, the base 322 of the actuation member 70 may be disposed between the second electrical connector 58 and an inner surface 330 of the second bracket end wall 114 of the carriage bracket 106. The base 322 may be coupled to the second electrical connector 58, which may allow the actuation member 70 to move the second electrical connector 58 between the engaged and disengaged positions 62, 66.

According to various aspects, the carriage bracket 106 may define a slot 334. In such aspects, the second bracket end wall 114 may define the slot 334. As illustrated in FIGS. 20 and 21, the slot 334 may have a substantially vertical orientation, however, it is contemplated that the slot 334 may have any practicable configuration for moving the actuation member 70 between the first and second positions 250, 270. The tab 326 of the actuation member 70 may extend through the slot 334. In this way, the actuation member 70 may extend through the carriage bracket 106 to couple with the second electrical connector 58.

Force may be applied to the tab 326 to move the actuation member 70 between the first and second positions 250, 270. In various examples, a downward force may be applied to the tab 326 to move the actuation member 70 from the first position 250 to the second position 270. Additionally or alternatively, an upward force may be applied to the tab 326 to move the actuation member 70 from the second position 270 to the first position 250. The force may be applied to the tab 326 proximate an outer surface 338 of the carriage bracket 106. Additionally, the force may be applied to the actuation member 70 proximate the inner surface 330 of the carriage bracket 106. Stated differently, a force acting on the actuation member 70 may result in movement of the actuation member 70. The force applied to the actuation member 70 may be a manual force or may be an automatic force that, for example, corresponds with the installation of the seating assembly 10 on the rail cartridge 46. When the actuation member 70 is in the first position 250, the second electrical connector 58 may be in the disengaged position 66. When the actuation member 70 is moved toward the second position 270, the second electrical connector 58 may correspondingly move toward the engaged position 62. When the actuation member 70 is in the second position 270, the second electrical connector 58 may be in the engaged position 62, thereby creating the electrical connection between the first and second electrical connectors 54, 58.

Use of the present disclosure may provide for a variety of advantages. For example, an electrical connection may be established between the vehicle 14 and the seating assembly 10. Additionally, the electrical connection may be established automatically with the installation of the seating assembly 10 onto the rail cartridge 46. Further, the electrical connection may be maintained when the seating assembly 10 is coupled with the rail cartridge 46 and interrupted upon removal of the seating assembly 10. Moreover, the first and second electrical connectors 54, 58 may be disposed in a variety of locations. The actuation member 70 may move the second electrical connector 58 from the disengaged position 66 to the engaged position 62 where the second electrical connector 58 engages the first electrical connector 54 providing the electrical connection therebetween. Also, the first electrical connector 54 coupled to the rail cartridge 46 and the second electrical connector 58 coupled to the carriage bracket 106 may provide the electrical connection between the vehicle 14 and the seat control module 310. In this way, the power and/or data 302 may be provided to the seating assembly 10. Additionally, the wiring harness 298 may be retained within the seating assembly 10 and may not be moved across the vehicle 14 as the seating assembly 10 translates fore and aft. Further, the first and second electrical connectors 54, 58 may self-align via the float tolerances, which may correct and/or prevent misalignment between the first and second electrical connectors 54, 58. These and other advantages may be realized and/or achieved.

According to various examples, a vehicle seating assembly includes a seat base. A carriage is coupled to a lower surface of the seat base and includes a locating protrusion on a bottom surface thereof. A track assembly includes a rail. A rail cartridge is slidably engaged with the rail. The rail cartridge defines a locating hole for receiving the locating protrusion. A first electrical connector is coupled to the rail cartridge. A second electrical connector is coupled to the carriage and operable between engaged and disengaged positions. An actuation member is configured to move the second electrical connector between the engaged and disengaged positions. When the second electrical connector is in the engaged position, an electrical connection is formed between the first and second electrical connectors. Embodiments of the present disclosure may include one or a combination of the following features:

- a motor disposed in a rail cartridge for laterally translating the rail cartridge between fore and aft positions;
- an actuation member rotates from a first position to a second position in response to engagement between a locating protrusion and the actuation member;
- an actuation member engages a first electrical connector when in a second position;
- a second electrical connector rotates from a disengaged position to an engaged position in response to engagement with an actuation member;
- a second electrical connector extends through an aperture defined by an upper surface of a rail cartridge to engage a first electrical connector;
- a bracket is coupled to a carriage and defines a slot and an actuation member is operably coupled to a second electrical connector and extends through the slot;
- an actuation member moves from a first position to a second position in response to a force acting on the actuation member proximate an outer surface of a bracket; and
- a first electrical connector is disposed on a spacer coupled to a rail cartridge.

According to various examples, a seating assembly includes a track assembly that includes a rail. A carriage includes a bracket that defines a locating protrusion that extends from a bottom surface thereof. A rail cartridge is slidably engaged with the rail and defines a locating hole in an upper surface thereof to receive the locating protrusion. A first electrical connector is coupled to the rail cartridge. A second electrical connector is coupled to the bracket and is configured to engage and disengage with the first electrical connector. An actuation member is operable between first and second positions and is configured to engage the second electrical connector. When the actuation members in the second position, the first and second electrical connectors are engaged and form an electrical connection. Embodiments of the present disclosure may include one or a combination of the following features:

an actuation member includes a first engagement feature, a second engagement feature, and an elongated support that extends therebetween;

an actuation member rotates about a pivot point in response to engagement with a locating protrusion, and the pivot point is disposed proximate a first engagement feature;

a second electrical connector includes a connector portion and an elongate arm;

a second electrical connector rotates and extends through an upper surface of a rail cartridge to engage a first electrical connector in response to an actuation member engaging an elongate arm;

an actuation member includes a base and a tab extending therefrom; and an actuation member moves a second electrical connector to engage a first electrical connector in response to a force applied to a tab.

According to various examples, a seat connection assembly includes a track assembly that includes a rail and a rail cartridge slidably engaged with the rail. A carriage bracket is coupled to an upper surface of the rail cartridge. A motor is disposed in the rail cartridge for translating the rail cartridge along the rail. A first electrical connector is coupled to the rail cartridge. A second electrical connector is coupled to the carriage bracket and operable between engaged and disengaged positions. The second electrical connector engages the first electrical connector in the engaged position to form an electrical connection. An actuation member is configured to move the second electrical connector between engaged and disengaged positions. Embodiments of the present disclosure may include one or a combination of the following features:

an actuation member extends through a carriage bracket coupled to a second electrical connector;

a second electrical connector extends through an aperture defined in an upper surface of a rail cartridge when in an engaged position; and a second electrical connector rotates to an engaged position in response to rotation of an actuation member.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Implementations of the systems, apparatuses, devices, and methods disclosed herein may include or utilize a special-purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that store computer-executable instructions are computer storage media (devices). Computer-readable media that carry computer-executable instructions are transmission media. Thus, by way of example, and not limitation, implementations of the present disclosure can include at least two distinctly different kinds of computer-readable media: computer storage media (devices) and transmission media.

Computer-executable instructions include, for example, instructions and data, which, when executed at a processor, cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating assembly, comprising:
a seat base;
a carriage coupled to a lower surface of the seat base and including a locating protrusion on a bottom surface thereof;
a track assembly including a rail;
a rail cartridge slidably engaged with the rail, wherein the rail cartridge defines a locating hole for receiving the locating protrusion;
a first electrical connector coupled to the rail cartridge;

a second electrical connector coupled to the carriage and operable between engaged and disengaged positions; and an actuation member actuated by the locating protrusion to move the second electrical connector between the engaged and disengaged positions, wherein when the second electrical connector is in the engaged position an electrical connection is formed between the first and second electrical connectors.

2. The vehicle seating assembly of claim 1, further comprising:

a motor disposed in the rail cartridge for laterally translating the rail cartridge between fore and aft positions.

3. The vehicle seating assembly of claim 1, wherein the actuation member rotates from a first position to a second position in response to engagement between the locating protrusion and the actuation member.

4. The vehicle seating assembly of claim 3, wherein the actuation member engages the second electrical connector when in the second position.

5. The vehicle seating assembly of claim 1, wherein the second electrical connector rotates from the disengaged position to the engaged position in response to engagement with the actuation member.

6. The vehicle seating assembly of claim 5, wherein the second electrical connector extends through an aperture defined by an upper surface of the rail cartridge to engage the first electrical connector.

7. The vehicle seating assembly of claim 1, further comprising:

a bracket coupled to the carriage and defining a slot, wherein the actuation member is operably coupled to the second electrical connector and extends through the slot.

8. The vehicle seating assembly of claim 7, wherein the actuation member moves from a first position to a second position in response to a force acting on the actuation member proximate an outer surface of the bracket.

9. The vehicle seating assembly of claim 7, wherein the first electrical connector is disposed on a spacer coupled to the rail cartridge.

10. A seating assembly, comprising:

a track assembly including a rail;

a carriage including a bracket defining a locating protrusion extending from a bottom surface thereof;

a rail cartridge slidably engaged with the rail and defining a locating hole in an upper surface thereof to receive the locating protrusion;

a first electrical connector coupled to the rail cartridge;

a second electrical connector coupled to the bracket and configured to engage and disengage with the first electrical connector; and an actuation member actuated by the locating protrusion between first and second positions and configured to engage the second electrical connector, wherein when the actuation member is in the second position the first and second electrical connectors are engaged and form an electrical connection.

11. The seating assembly of claim 10, wherein the actuation member includes a first engagement feature, a second engagement feature, and an elongated support extending therebetween.

12. The seating assembly of claim 11, wherein the actuation member rotates about a pivot point in response to engagement with the locating protrusion, and wherein the pivot point is disposed proximate the first engagement feature.

13. The seating assembly of claim 10, wherein the second electrical connector includes a connector portion and an elongate arm.

14. The seating assembly of claim 13, wherein the second electrical connector rotates and extends through the upper surface of the rail cartridge to engage the first electrical connector in response to the actuation member engaging the elongate arm.

15. The seating assembly of claim 10, wherein the actuation member includes a base and a tab extending therefrom.

16. The seating assembly of claim 15, wherein the actuation member moves the second electrical connector to engage the first electrical connector in response to a force applied to the tab.

17. A seat connection assembly, comprising a track assembly including a rail and a rail cartridge slidably engaged within the rail;

a carriage bracket coupled to an upper surface of the rail cartridge, and including a locating protrusion;

a motor disposed in the rail cartridge for translating the rail cartridge along the rail;

a first electrical connector coupled to the rail cartridge;

a second electrical connector coupled to the carriage bracket and operable between engaged and disengaged positions, wherein the second electrical connector engages the first electrical connector in the engaged position to form an electrical connection; and an actuation member actuated by the locating protrusion to move the second electrical connector between the engaged and disengaged positions.

18. The seat connection assembly of claim 17, wherein the actuation member extends through the carriage bracket to couple to the second electrical connector.

19. The seat connection assembly of claim 17, wherein the second electrical connector extends through an aperture defined in the upper surface of the rail cartridge when in the engaged position.

20. The seat connection assembly of claim 17, wherein the second electrical connector rotates to the engaged position in response to rotation of the actuation member.

* * * * *